(12) United States Patent
Abdelkhalik et al.

(10) Patent No.: US 10,415,537 B2
(45) Date of Patent: *Sep. 17, 2019

(54) MODEL PREDICTIVE CONTROL OF PARAMETRIC EXCITED PITCH-SURGE MODES IN WAVE ENERGY CONVERTERS

(71) Applicants: National Technology & Engineering Solutions of Sandia, LLC, Albuquerque, NM (US); Michigan Technological University, Houghton, MI (US); South Dakota Board of Regents, Pierre, SD (US)

(72) Inventors: Ossama Abdelkhalik, Houghton, MI (US); Rush D. Robinett, III, Tijeras, NM (US); Shangyan Zou, Houghton, MI (US); David G. Wilson, Tijeras, NM (US); Giorgio Bacelli, Albuquerque, NM (US); Umesh Korde, Hancock, MI (US); Ryan G. Coe, Albuquerque, NM (US)

(73) Assignees: National Technology & Engineering Solutions of Sandia, LLC, Albuquerque, NM (US); Michigan Technological University, Houghton, MI (US); South Dakota Board of Regents, Pierre, SD (US)

(*) Notice: Subject to any disclaimer, the term of this patent is extended or adjusted under 35 U.S.C. 154(b) by 0 days.

This patent is subject to a terminal disclaimer.

(21) Appl. No.: 15/837,885

(22) Filed: Dec. 11, 2017

(65) Prior Publication Data
US 2018/0163691 A1   Jun. 14, 2018

Related U.S. Application Data

(60) Provisional application No. 62/432,417, filed on Dec. 9, 2016.

(51) Int. Cl.
  *F03B 13/10*   (2006.01)
  *F03B 13/12*   (2006.01)
  (Continued)

(52) U.S. Cl.
  CPC ............ *F03B 13/183* (2013.01); *F03B 13/16* (2013.01); *F03B 15/00* (2013.01); *G06F 1/02* (2013.01);
  (Continued)

(58) Field of Classification Search
  CPC .......... F03B 13/16; F03B 15/00; F03B 15/20
  See application file for complete search history.

(56) References Cited

U.S. PATENT DOCUMENTS

| | | | | |
|---|---|---|---|---|
| 4,189,918 A * | 2/1980 | Moody | ................ | F03B 13/142 290/53 |
| 4,220,044 A * | 9/1980 | LeBlanc | .............. | G01C 13/002 73/170.01 |

(Continued)

OTHER PUBLICATIONS

Yavuz, Hakan, "On Control of a Pitching and Surging Wave Energy Converter", 2011, International Journal of Green Energy, 8, 555-584 (Year: 2011).*

(Continued)

*Primary Examiner* — Tulsidas C Patel
*Assistant Examiner* — Thomas K Quigley
(74) *Attorney, Agent, or Firm* — Kevin W. Bieg

(57) ABSTRACT

A parametric excitation dynamic model is used for a three degrees-of-freedom (3-DOF) wave energy converter. Since the heave motion is uncoupled from the pitch and surge modes, the pitch-surge equations of motion can be treated as a linear time varying system, or a linear system with parametric excitation. In such case the parametric exciting frequency can be tuned to twice the natural frequency of the system for higher energy harvesting. A parametric excited 3-DOF wave energy converter can harvest more power, for (Continued)

both regular and irregular waves, compared to the linear 3-DOF. For example, in a Bretschneider wave, the harvested energy in the three modes is about 3.8 times the energy harvested in the heave mode alone; while the same device produces about 3.1 times the heave mode energy when using a linear 3-DOF model.

3 Claims, 24 Drawing Sheets

(51) Int. Cl.
 *F03B 13/18* (2006.01)
 *F03B 15/00* (2006.01)
 *G06F 1/02* (2006.01)
 *F03B 13/16* (2006.01)

(52) U.S. Cl.
 CPC .......... *G06F 1/022* (2013.01); *F05B 2250/43* (2013.01); *F05B 2270/20* (2013.01); *Y02E 10/38* (2013.01)

(56) References Cited

U.S. PATENT DOCUMENTS

| | | | | |
|---|---|---|---|---|
| 4,468,205 | A * | 8/1984 | Pedersen | B63B 22/021 114/230.14 |
| 4,867,211 | A * | 9/1989 | Dodge | B63B 27/24 141/279 |
| 4,938,630 | A * | 7/1990 | Karsan | B63B 21/50 114/264 |
| 4,996,840 | A * | 3/1991 | Marx | F03B 13/183 60/398 |
| 5,435,262 | A * | 7/1995 | Grinius | B63B 22/021 114/264 |
| 6,631,300 | B1 * | 10/2003 | Nayfeh | B66C 13/063 212/271 |
| 7,909,536 | B2 * | 3/2011 | Dick | B63B 35/44 405/76 |
| 7,989,975 | B2 * | 8/2011 | Clement | F03B 13/20 290/53 |
| 9,140,231 | B1 * | 9/2015 | Wilson | F03B 15/00 |
| 2007/0266704 | A1 * | 11/2007 | Bull | B63B 35/4406 60/398 |
| 2010/0148504 | A1 * | 6/2010 | Gerber | F03B 13/16 290/42 |
| 2011/0089696 | A1 * | 4/2011 | Davis | F03B 13/1865 290/53 |
| 2011/0093092 | A1 * | 4/2011 | Choi | A47C 1/12 700/11 |
| 2013/0025937 | A1 * | 1/2013 | Pilgrim | E21B 21/01 175/24 |
| 2013/0113211 | A1 * | 5/2013 | Rohrer | F03B 13/182 290/42 |
| 2014/0045394 | A1 * | 2/2014 | Woldring | B63B 21/20 441/3 |
| 2015/0152836 | A1 * | 6/2015 | Stansby | F03B 13/16 60/497 |
| 2017/0226984 | A1 * | 8/2017 | Gregory | F03B 13/1895 |
| 2017/0298899 | A1 * | 10/2017 | Abdelkhalik | F03B 15/00 |
| 2017/0371056 | A1 * | 12/2017 | Toennessen | B63B 21/66 |
| 2018/0163690 | A1 | 6/2018 | Abdelkhalik et al. | |
| 2018/0164754 | A1 | 6/2018 | Wilson et al. | |
| 2018/0164755 | A1 | 6/2018 | Abdelkhalik et al. | |

OTHER PUBLICATIONS

Ringwood et al., "A critical comparison of model-predictive and pseudospectral control for wave energy devices", Jun. 14, 2016, Journal of Ocean Engineering and Marine Energy, 2(4), 485-499 (Year: 2016).*

Abdelkhalik, O. et al., "Estimation of excitation forces for wave energy converters control using pressure measurements", Int. J. Control 90(8), (2016), pp. 1793-1805.

Cretel, J.A.M. et al., "Maximisation of Energy Capture by a Wave-Energy Point Absorber using Model Predictive Control", Proceedings of the 18th World Congress, The International Federation of Automatic Control, Milano (Italy), IFAC Proceedings 44.1, 3714, (2011), pp. 3714-3721.

Falnes, J., "A review of wave-energy extraction", J., Marine Structures 20(4), (2007), pp. 185-201.

Halliday, J.R. et al., "An application of the Fast Fourier Transform to the short-term prediction of sea wave behaviour",Renewable Energy 36(6), (2011), pp. 1685-1692.

Hals, J. et al., "Constrained Optimal Control of a Heaving Buoy Wave-Energy Converter", J. Offshore Mech. Arctic Eng. 133(1) (2011), pp. 011401-1-011401-15.

Hals, J. et al., "A Comparison of Selected Strategies for Adaptive Control of Wave Energy Converters", J. Offshore Mech. Arctic Eng. 133(3), 031101 (2011), pp. 031101-1-031101-12.

Villegas, C. and Van Der Schaaf, H., "Implementation of a Pitch Stability Control for a Wave Energy Converter," Proc. 10th Euro. Wave and Tidal Energy Conf. Southampton, UK, (2011), 6 pages.

Zaghari, B. et al., "Energy Harvesting Using Parametric Excitation," Theme Conference, Institute of Sound and Vibration Research, Univ. of Southampton, United Kingdom, May 2014.

* cited by examiner

MODEL PREDICTIVE CONTROL OF PARAMETRIC EXCITED PITCH-SURGE MODES IN WAVE ENERGY CONVERTERS

CROSS-REFERENCE TO RELATED APPLICATIONS

This application claims the benefit of U.S. Provisional Application No. 62/432,417, filed Dec. 9, 2016, which is incorporated herein by reference. This application is related to U.S. application Ser. No. 15/837,853, titled "Pseudo-spectral method to control three-degree-of-freedom wave energy converters," filed of even date with this application, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to wave energy converters and, in particular, model predictive control of parametric excited pitch-surge modes in wave energy converters.

BACKGROUND OF THE INVENTION

Wave energy is estimated to have a potential of two terawatts worldwide. See B. Drew et al., *Proc. Inst. Mech. Eng. A J. Power Energy* 223(8), 887 (2009). An important aspect in harvesting wave energy is the ability to extract energy in an economic way; and hence optimizing the design and control of wave energy converters (WECs) is crucial. WEC optimization is centered on how the WEC responds to incident waves; and an important aspect of that response is the control logic. Research on WECs started in 1970s, when fundamental developments on the hydrodynamics of multi-degrees-of-freedom (MDOF) WECs were carried out. See D. V. Evans, *J. Fluid Mech.* 77, 1 (1976); J. N. Newman, "The interaction of stationary vessels with regular waves," in *Proceeding 11th symposium, Naval hydrodynamics, London* (1976); and C. C. Mei, *J. Ship Res.* 20, 63 (1976). In particular, the analysis of Evans motivates the use of MDOF WECs as opposed to a single DOF WEC. For the hydrodynamics of a MDOF WEC, Vugts used velocity potential to solve for the radiation hydrodynamic coefficients and Newman applied Haskind relations to compute the excitation force. See J. H. Vugts, *The hydrodynamic coefficients for swaying, heaving and rolling cylinders on a free surface*, Shipbuilding Laboratory, Technical University Delft, 1968; and J. N. Newman, "The exciting forces on fixed bodies in waves," *J. Ship Res.*, 10 (1965). Later, several boundary element numerical tools were developed to compute the hydrodynamic coefficients for different shapes of buoys; of them are WAMIT, AQWA, OpenWARP, and NEMOH, which are frequency domain solvers that implement linear potential flow theory. See A. Babarit and G. Delhommeau, "Theoretical and numerical aspects of the open source BEM solver NEMOH," *Proceedings of the 11th European Wave and Tidal Energy Conference*, Nantes, France, September 2015. In terms of the wave/body interaction, there are several references that detail the dynamics equations; of them is Korde-Ringwood and J. Falnes which give a complete development for the dynamics of six degrees-of-freedom motions resulting from buoy-wave interaction. See J. Falnes, *Ocean Waves and Oscillating Systems—Linear Interactions Including Wave-Energy Extraction*, Cambridge University Press, 2002.

On the controls side, however, most of the work in the literature has focused on the single DOF WEC. There have been significant developments on several concepts of control methods for single DOF WECs; many of these methods are well documented. See J. Falnes, *Marine Structures* 20(4), 185 (2007); U. A. Korde, *OCEANS '98 Conference Proceedings* 3, 1427 (1998); U. A. Korde et al., "Time domain control of a single mode wave energy device," *Proceedings of the Eleventh International Offshore and Polar Engineering Conference*, Stavanger, Norway, 2001, pp. 555-560; F. Fusco and J. Ringwood, *IEEE Trans. Sustain. Energy* 5(3), 958 (2014); J. Ringwood et al., *Control Syst. Mag.* 34(5), 30 (2014); and J. Scruggs et al., *Appl. Ocean Res.* 42, 1 (2013). Of particular interest among these methods is the Model Predictive Control (MPC). See J. Cretel et al., *IFAC Proceedings* 44.1, 3714 (2011); G. Li and M. R. Belmont, *Renew. Energy* 69, 453 (2014); D. Oetinger et al., *IEEE Trans. Sustain. Energy* 5(4), 1099 (2014); M. N. Soltani et al., "Model predictive control of buoy type wave energy converter," *The 19th International Federation of Automatic Control (IFAC) World Congress*, Cape Town, South Africa, Aug. 24-29, 2014; and G. Li, *Int. J. Control* 89, 1 (2015). In MPC, the wave is assumed to be known over a finite future horizon and the control objective is to maximize energy harvesting over this future time horizon, subject to constraints. The wave information that is available over the future horizon could be in the form of wave elevation or wave excitation force. One MPC implementation is the work by Hals et al., in which a MPC is implemented for a heave WEC device. See J. Hals et al., *J. Offshore Mech. Arctic Eng.* 133(1), 1 (2011). It repeatedly solves the optimization problem online in order to compute the optimal control on a receding horizon. The wave excitation force is predicted by use of an augmented Kalman filter based on a damped harmonic oscillator model of the wave process. Hals et al. investigated two different MPC objective functions. See Hals et al., *J. Offshore Mech. Arctic Eng.* 133(3), 031101 (2011). The first objective function is the difference between the energy entering the system and the energy radiated away from the system over the prediction horizon. The second objective function is the power absorbed by the Power Take Off unit (PTO) over the prediction horizon. Another MPC implementation is the work developed by Cretel et al. in which the objective is a refined form of maximizing the energy capture by a point absorber, while utilizing the estimation and short-term prediction of the wave excitation force. See J. Cretel et al., *IFAC Proceedings* 44.1, 3714 (2011). Overall, the MPC has proven to be one of the most powerful methods for energy harvesting in the single DOF point absorbers.

A MPC needs a prediction for the wave excitation force over a future time horizon. Techniques for predicting the wave elevation and using that to estimate the excitation force are well established. See A. K. Brask, "Control and estimation of wave energy converters," MS Thesis, Norwegian University of Science and Technology, Department of Marine Technology, Norway, June 2015. For instance, Deterministic Sea Wave Prediction (DSWP) has been studied extensively in the literature where the water surface elevation is measured at one or more locations, and then those measurements are propagated forward using a wave dispersion model. Zhang et al. develop a directional hybrid wave model for short-crested irregular ocean waves for use in DSWP. See J. Zhang et al., *Appl. Ocean Res.* 21(4), 167 (1999). More recently, Halliday et al. investigated the use of Fast Fourier Transform (FFT) in making predictions of wave elevation and highlighted the challenges due to the periodic nature of the FFT that does not fit with the non-periodic measured signal. See J. R. Halliday et al., *Renew. Energy* 36(6), 1685 (2011). For wave prediction, LIDAR devices also can be used to scan the incident wave field in front of a WEC, and then propagate the measured wave field forward in space and time using a wave model for prediction. See M. R. Belmont and P. Ashwin, *J. Atmospheric Ocean. Technol.* 28(12), 1672 (2011). There are a number of candidate techniques that can be used for this type of problem such as the extended Kalman filter (EKF), the linear autoregressive model, and neural networks. See F. Fusco and J. V. Ringwood, *IEEE Trans. Sustain. Energy* 1(2), 99 (2010); and S. Hadadpour et al., "Wave energy forecasting using artificial neural networks in the Caspian sea," *Proceedings of the Institution of Civil Engineers-Maritime Engineering*, vol. 167, no. 1, Institute of Civil Engineers, 2014, pp. 42-52. Recently Ling used an EKF, with a simplified linear frequency-invariant state-space model, for estimating the excitation force on a point absorber WEC, through measuring the buoy position and velocity. See B. A. Ling, "Real-time estimation and prediction of wave excitation forces for wave energy control applications," MS Thesis, Oregon State University, June 2015; and B. A. Ling and B. A. Batten, "Real time estimation and prediction of wave excitation forces on a heaving body," *ASME 2015 34th International Conference on Ocean, Offshore and Arctic Engineering*, vol. 9: Ocean Renewable Energy, no. OMAE2015-41087, St. Johns, Newfoundland, Canada: ASME, May 31-Jun. 5, 2015. The estimated excitation force is then used for predicting excitation force over short time horizons. More recently, Abdelkhalik et al. used pressure measurements to estimate the excitation force using an extended Kalman filter. See O. Abdelkhalik et al., *Int. J. Control* 90(8), 1793 (2016).

SUMMARY OF THE INVENTION

This invention uses a parametric excitation dynamic model for three-degrees-of-freedom wave energy converter. The model is used as part of the feedforward prediction portion of the control system. The heave motion is uncoupled from pitch and surge modes. The heave motion is optimized independently (i.e., multi-resonator single DOF control, or other techniques). The pitch-surge equations of motion are treated as linear "time varying" system, or a linear system with "parametric excitation." For this unique condition, the natural frequency of the system can be tuned to half the parametric exciting frequency to produce higher energy harvesting. A model predictive control (MPC) is used to search for the optimal control. The optimality necessary conditions were derived and a simple optimizer is implemented to search for the solution. The optimizer objective function selected maximizes the energy harvesting from the coupled pitch-surge modes model. Feedback of either position/velocity and wave prediction information is a prerequisite. The numerical simulation results demonstrate proof-of-concept that a parametric excited 3-DOF wave energy converter can harvest more power, utilizing MPC parametrically excited control for WECS, for both regular and irregular waves when compared to a conventional linear 3-DOF system.

BRIEF DESCRIPTION OF THE DRAWINGS

The detailed description will refer to the following drawings, wherein like elements are referred to by like numbers.

DETAILED DESCRIPTION OF THE INVENTION

The present invention is directed to the control of a parametric excited 3-DOF pitch-surge-heave WEC device. As an example, MPC is implemented to compute the control. The excitation force is assumed known over a short time horizon. This 3-DOF problem is characterized by two main aspects. First, the pitch and surge modes are coupled. Second, the heave—despite being uncoupled—excites the pitch mode through a nonlinear term; which is usually called the parametric excitation term. See C. Villegas and H. van der Schaaf, "Implementation of a pitch stability control for a wave energy converter," *Proc. 10th Euro. Wave and Tidal Energy Conf.* Southampton, U K, 2011. In fact, Villegas and van der Schaaf point out that floating structures can be subject to parametric instability arising from variations of the pitch restoring coefficient. A similar problem is the problem of a 1-DOF mechanical oscillator with time-varying stiffness, subject to a harmonic base excitation that acts as a periodic time-varying stiffness, studied by Zaghari et al., and it is found that there is a potential to harvest more energy because of this parametric excitation effect. See B. Zaghari et al., "Mechanical modeling of a vibration energy harvester with time-varying stiffness," *Proceedings of the 9th International Conference on Structural Dynamics*, EURODYN 2014, A. Cunha et al., Eds., Porto, Portugal, 30 Jun.-2 Jul. 2014.

The invention can be used with a variety of WECs and controllers thereof. For example, various technologies pertaining to designing and implementing a controller in a WEC, wherein the controller is configured to improve efficiency of the WEC by expanding a wave frequency spectrum over which the WEC can efficiently absorb wave energy are described in related U.S. Pat. No. 9,140,231, which is incorporated herein by reference.

Figure 1:
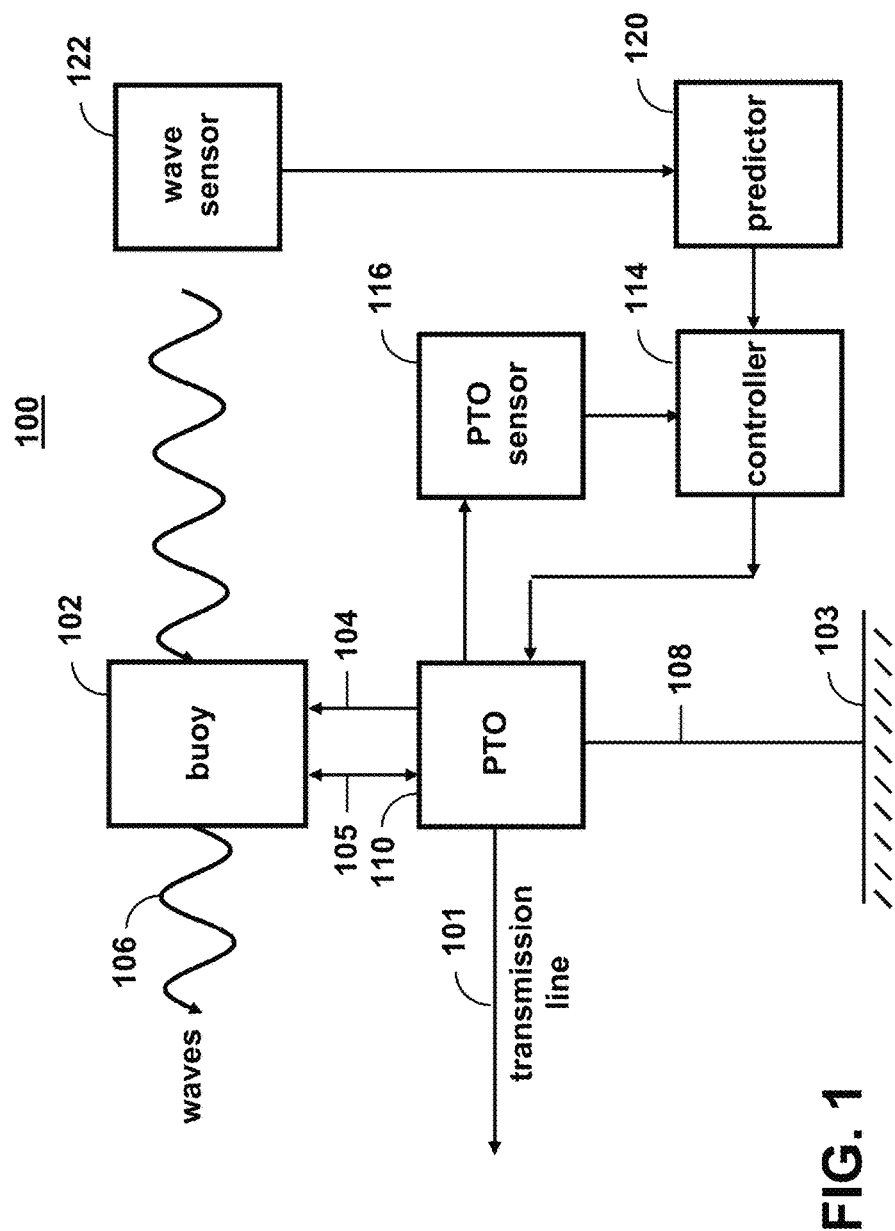
FIG. 1 is a schematic illustration of a wave energy converter.

An exemplary WEC 100 is illustrated in FIG. 1. The WEC 100 is intended to be placed in a body of water (e.g., the ocean) and subjected to wave motion of varying amplitude and frequency. The WEC 100 can be classified as a resonant responder, as its structural design can have a resonance frequency that is within a predominant wave frequency spectrum of the body of water in which the WEC 100 is deployed. When a series of waves 106 of the resonance frequency impact the WEC 100, the WEC 100 will resonantly respond, thus absorbing a relatively large amount of energy of the waves that are impacting the WEC. Thus, the WEC 100 can be configured to convert incident energy existent in waves into mechanical energy. The mechanical energy can then be transformed into electrical energy by a power take-off 110, and can be transmitted by way of a transmission line 101 to a substation or other suitable energy or transmission system. Additionally, while not shown, the WEC 100 may include local storage, such as a battery, a capacitor bank, or the like, that can at least temporarily retain DC energy in the WEC 100. Further, the WEC 100 can extract such stored energy when needed, wherein extracted energy can be used to control the operation of the WEC 100, to provide power to lights on the WEC, to provide power to sensors on the WEC, to provide power to a processor or circuit that processes sensor data, to provide power to a transceiver that communicates to another system or WEC, etc.

The exemplary WEC 100 shown includes a buoy 102 that is mechanically coupled to a reference, in this example a stationary reference such as an anchor to an ocean-floor mooring 103. The buoy 102 is designed to generally move with 3 DOFs (up and down along a vertical axis in a heaving motion, in an up/down rotation about a center-of-gravity in a pitching motion, and back-and-forth, side-to-side in a surging motion) in phase with waves 106 in a body of water. Such body of water can be an ocean, a sea, a relatively large lake, etc. As shown, the reference 103 can remain stationary (e.g., anchored to an ocean-floor mooring) as the buoy 102 moves. While the exemplary WEC 100 shown is the simple case of a one-body resonant WEC, aspects described herein are not limited to a one-body absorber. Rather, aspects described herein can be utilized in any resonant WEC, including a two-body resonant WEC, wherein the buoy moves relative to a moveable spar, or an n-body resonant WEC.

A mechanical energy conversion chain 108 couples the buoy 102 to the reference 103. The mechanical energy conversion chain 108 includes a power take off (PTO) 110. The PTO 110 is configured to convert the motion 105 of the buoy 102 to electrical energy, which can then be output by way of the transmission line 101. For example, the PTO 110 can include mechanical elements that are generally utilized, for example, to translate the motion 105 of the buoy 102 into rotary motion. The PTO 110 can further include a generator that is configured to translate the rotary motion into electrical energy. Exemplary mechanical elements that can be included in the PTO 110 include, but are not limited to, a rack and pinion system, a hydraulic system, a flywheel, or a ball screw. Additional elements that can be included in the PTO 110 include, but are not limited to, a water turbine, an air turbine, a linear generator, etc.

As indicated above, the WEC 100 can be structurally designed to have a resonant frequency within a predominant spectral range of waves 106 in the body of water. Accordingly, when waves corresponding to the resonant frequency of the WEC 100 impact the WEC 100, relatively large amplitude motion is created between the buoy 102 and the reference 103, wherein such motion is translated by the PTO 110 into electrical energy. Conventional WECs, however, tend to be relatively inefficient when waves in the body of water do not correspond to the resonant frequency of the WEC 100.

To that end, the WEC 100 can include a controller 114 that is configured to control operation of the PTO 110 to cause the PTO 110 to generate larger amounts of electrical energy over time when compared to conventional WECs. The controller 114 outputs control signals that are received by actuators in the PTO 110, and the actuators operate based upon the control signals received from the controller 114. For example, the controller 114 can utilize reactive control techniques, whereby the controller 114 can cause the PTO 110 to act as a motor to affect the displacement between the buoy 102 and the reference 103 (i.e., reactive power refers to power that is expended by the WEC). Additionally, the controller 114 can utilize adaptive control techniques, such that the controller 114 can consider variations in parameters that affect the operation of the WEC 100. In general, the controller 114 can control the PTO 110 to cause the WEC 100 to remain on resonance when off-resonance waves impact the buoy 102, and can cause the WEC 100 to relatively quickly return to resonance when waves impacting the buoy 102 cause the WEC 100 to go off resonance. To that end, the controller 114 can cause the PTO 110 to exert forces 104 on the buoy 102, wherein the exerted forces are in the direction of the heave, pitch, and surge forces exerted on the WEC 100 by an impinging wave. In another example, the controller 114 can cause the PTO 110 to exert forces on the buoy 102 in an opposite direction of heave, pitch, and surge forces exerted on the WEC 100 by an impinging wave.

The controller 114 can take into consideration signals from one or more sensors when controlling operation of the PTO 110. For instance, a PTO sensor 116 can output a signal that is indicative of at least one operating parameter of the PTO 110. Such operating parameter may be, for example, an amount of electrical energy being generated by the PTO 110, positions of mechanical elements in the PTO 110, an amount of force being exerted by an actuator on the buoy 102, etc. The sensor 116 can further provide a signal to the controller 114 indicative of a condition of the WEC 100 relative to its environment. For instance, the sensor 116 can be configured to output positional information that indicates a position of the buoy 102 relative to the reference, such as an ocean floor-mooring or a spar.

In addition, the WEC can include a predictor 120 that can be or be included in a microprocessor, Application Specific Integrated Circuit (ASIC), Field Programmable Gate Array (FPGA), a System on a Chip (SoC), etc. For instance, a microprocessor can be programmed to perform functionality described below as being performed by the predictor 120. Likewise, an ASIC or FPGA can be designed and/or programmed to perform the functionality described below as being performed by the predictor 120. The predictor 120 predicts a time when a wave will impact buoy 102, as well as an excitation force of the wave at the time the wave is predicted to impact the buoy 102. For example, a wave sensor 122 can be positioned a distance (e.g., 100 meters) from the WEC 100, and can output a signal that is indicative of velocity of a wave, amplitude of the wave, etc. For instance, the wave sensor 122 may have a wireless transceiver thereon, which is configured to transmit the signal to the WEC 100 (and the predictor 120). In another example, the wave sensor 122 can be connected to the predictor 120 by way of a wired connection. The predictor 120 may further receive other signals from sensors that can be indicative of environmental conditions, such as wind speeds, humidity, and the like. The predictor 120 can output the predicted time of impact of the wave with the WEC 100 and predicted excitation force of the wave at the time of impact based upon the above-mentioned signals and wave prediction methods. Additionally, the predictor 120 can generate the predictions based upon historically observed data pertaining to waves.

The controller 114 receives the predictions from the predictor 120, and controls operation of the PTO 110 based upon the predictions. For instance, the controller 114 can receive the predictions and compute a desired position of the buoy 102 (e.g., elevation) at the time that the wave impacts the buoy 102. The controller 114 outputs control signals to the PTO 110, then, based upon the desired position of the buoy 102 at the future time and current position of the buoy 102, an amount of power that needs to be employed by the PTO 110 to place the buoy 102 in the desired position, etc.

The objective of the controller 114 is to control the PTO 110 such that the power flow is maximized, e.g., the position of the buoy 102 with respect to waves 106 in the body of water, over time, conforms to the resonant frequency of the WEC 100. Specifically, the controller 114 can be designed to control the PTO 110 to output a mechanical force that places the WEC 100 at its resonant frequency. Design of the controller 114 is now described.

Mathematical Model

Figure 2:
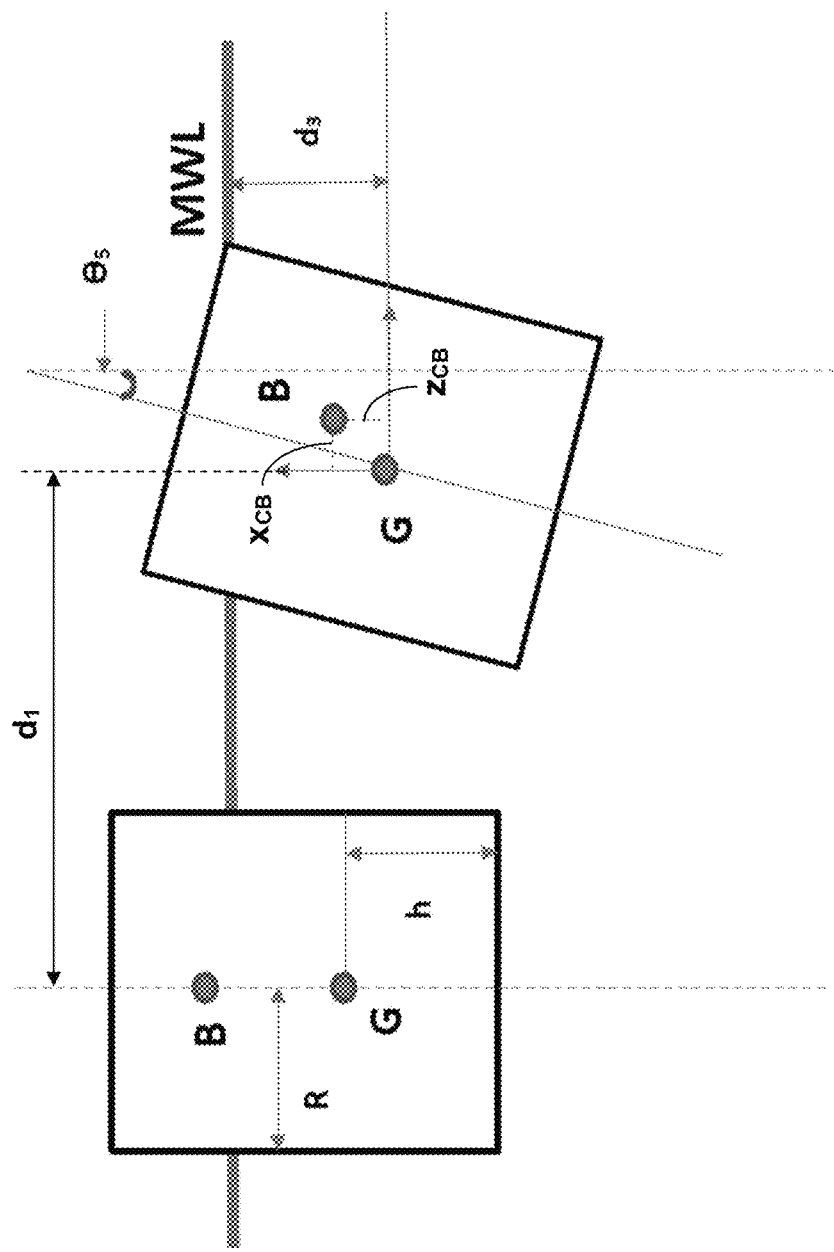
FIG. 2 is a schematic illustration of the geometry of a 3-DoF cylindrical buoy.

The present invention is directed to the control of a parametric excited WEC device. To capture additional power, the heave DOF can be used to couple, through parametric excitation, the other two DOFs, pitch and surge. A mathematical model of a 3-DOF WEC can be used to highlight the parametric excitation term in the pitch motion. Consider the heave, pitch, and surge degrees-of-freedom of a cylindrical buoy with base radius R, and a mass m, as shown in FIG. 2. Assuming a body-fixed coordinate system located at the buoy's center-of-gravity G. The pitch restoring moment is:

$$T_y = \rho g V x_{CB} \tag{1}$$

where $x_{CB}$ is the x-coordinate of the center of buoyancy B, $\rho$ is the water density, g is the gravitational acceleration, and V is the submerged volume. Let h be the height of the center-of-gravity from the base, $d_3$ is the vertical position of the center-of-gravity from the mean water level MWL, and $\theta_5$ is the pitch angle. The submerged volume is:

$$V = \pi R^2 \left( h + \frac{d_3}{\cos(\theta_5)} \right) \tag{2}$$

The coordinates of the center-of-buoyancy are:

$$x_{CB} = \frac{\sin(\theta_5)(R^2\cos(\theta_5)^2 + R^2 + 4h^2\cos(\theta_5)^2 + 8hd_3\cos(\theta_5) + 4d_3^2)}{8\cos(\theta_5)(d_3 + h\cos(\theta_5))} \tag{3}$$

$$z_{CB} = \frac{(R^2\cos(\theta_5)^2 - R^2 + 4h^2\cos(\theta_5)^2 + 8hd_3\cos(\theta_5) + 4d_3^2)}{8(d_3 + h\cos(\theta_5))} \tag{4}$$

The resulting pitch restoring moment is:

$$\tau_y = -\pi \rho g R^2 \sin(\theta_5)\left(h + \frac{d_3}{\cos(\theta_5)}\right) \tag{5}$$
$$\frac{(R^2\cos(\theta_5)^2 + R^2 + 4h^2\cos(\theta_5)^2 + 8hd_3\cos(\theta_5) + 4d_3^2)}{8\cos(\theta_5)(d_3 + h\cos(\theta_5))}$$

Linearizing Eq. (5) using a Taylor expansion to a first order, the following is obtained:

$$\tau_y \approx \frac{-\pi \rho g R^2}{4}(R^2 + 2h^2 + 4hd_3 + 2d_3^2)\theta_5 \tag{6}$$

The heave restoring force is:

$$F_h = \rho g \pi R^2 \left( \frac{d_3}{\cos(\theta_5)} - d_{30} \right) \tag{7}$$
$$\approx \rho g \pi R^2 \left( d_3 \left(1 + \frac{\theta_5^2}{2}\right) - d_{30} \right)$$

where $d_{30}$ is the vertical position of the center-of-gravity at equilibrium, for $\theta_5 = 0$.

The system equations of motion are then:

$$(m + m_\infty^{11})\ddot{d}_1 + m_\infty^{15}\ddot{\theta}_5 + b_1\dot{d}_1 + k_{moor}d_1 = F_e^1 + F_{rad}^1 + u_1 \tag{8}$$

$$(m + m_\infty^{33})\ddot{d}_3 + b_3\dot{d}_3 + \rho g \pi R^2 \left( d_3\left(1 + \frac{\theta_5^2}{2}\right) - d_{30} \right) = F_e^3 + F_{rad}^3 + u_3 \tag{9}$$

$$(I_5 + I_\infty^{55})\ddot{\theta}_5 + I_\infty^{51}\ddot{d}_1 + b_5\dot{\theta}_5 + \frac{\pi \rho g R^2}{4}(R^2 + 2h^2 + 4hd_3 + 2d_3^2)\theta_5 = \tag{10}$$
$$F_e^5 + F_{rad}^5 + u_5$$

where $d_1$ is the surge displacement, $d_3$ is the heave displacement, and $\theta_5$ is the pitch angular displacement. The radiation forces can be expressed as:

$$F_{rad}^1 = h_{11}*\dot{d}_1 + h_{15}*\dot{\theta}_5$$

$$F_{rad}^3 = h_{33}*\dot{d}_3$$

$$F_{rad}^5 = h_{51}*\dot{d}_1 + h_{55}*\dot{\theta}_5$$

where * denotes the convolution operator, and $h_{ij}$ are the radiation impulses.

Eqs. (8)-(10) are coupled and nonlinear. If Eq. (9) is linearized, the heave equation becomes linear and decoupled from the surge-pitch equations. If the surge-pitch equations are linearized assuming the heave displacement $d_3$ as an input to the pitch-surge motions, a coupled system of equations is obtained of the form:

$$[M]\vec{\ddot{x}} + [C]\vec{\dot{x}} + [K]\vec{x} = \vec{F}_e + \vec{u} \quad (11)$$

where the excitation force vector $\vec{F}_e = [F_e^1, F_e^5]^T$, the control force vector $\vec{u} = [u_1, u_5]^T$, the matrix $[M]$ is:

$$[M] = \begin{bmatrix} m + m_\infty^{11} & m_\infty^{15} \\ I_\infty^{51} & I_5 + I_\infty^{55} \end{bmatrix},$$

the matrix $[C]$ is:

$$[C] = \begin{bmatrix} b_1 - h_{11} & -h_{15} \\ -h_{51} & b_5 - h_{55} \end{bmatrix},$$

and the matrix $[K]$ is:

$$[K] = \begin{bmatrix} k_{moor} & 0 \\ 0 & k_{22} \end{bmatrix}, \quad (12)$$

where $$k_{22} = \frac{\pi \rho g R^2}{4}(R^2 + 2h^2 + 4hd_3 + 2d_3^2)$$

Neglecting the term $d_3^2$ compared to the $d_3$ term, then:

$$k_{22} \approx \frac{\pi \rho g R^2}{4}(R^2 + 2h^2 + 4hd_3) \quad (13)$$

which can be recognized as two terms; the first is a constant stiffness and the second term has $d_3$ which is a variable input. The second term is usually referred to as a parametric excitation term. The heave is said to parametric excite the pitch motion, which in turn is coupled to the surge motion.

The WEC Control Problem

Since the heave motion is decoupled from the pitch-surge motions, the control problem for the heave mode can be solved independently from the pitch and surge modes. The control of the heave motion can be addressed as described in the Background section. The simulation results described below will show energy harvested in the heave mode to compare it with the energy absorption in the pitch and surge modes. For example, the heave control can be computed using a singular-arc control method which is a time domain implementation for the complex conjugate control. See O. Abdelkhalik et al., *Int. J. Control* 90(8), 1793 (2016); and J. Falnes, *Marine Structures* 20(4), 185 (2007); and U.S. application Ser. No. 15/830,752, filed Dec. 4, 2017 and titled "Multi-resonant feedback control of a single degree-of-freedom wave energy converter," which is incorporated herein by reference. Finally note that for optimal heave energy absorption, the heave system should be in resonance with the wave excitation force.

Figure 3:
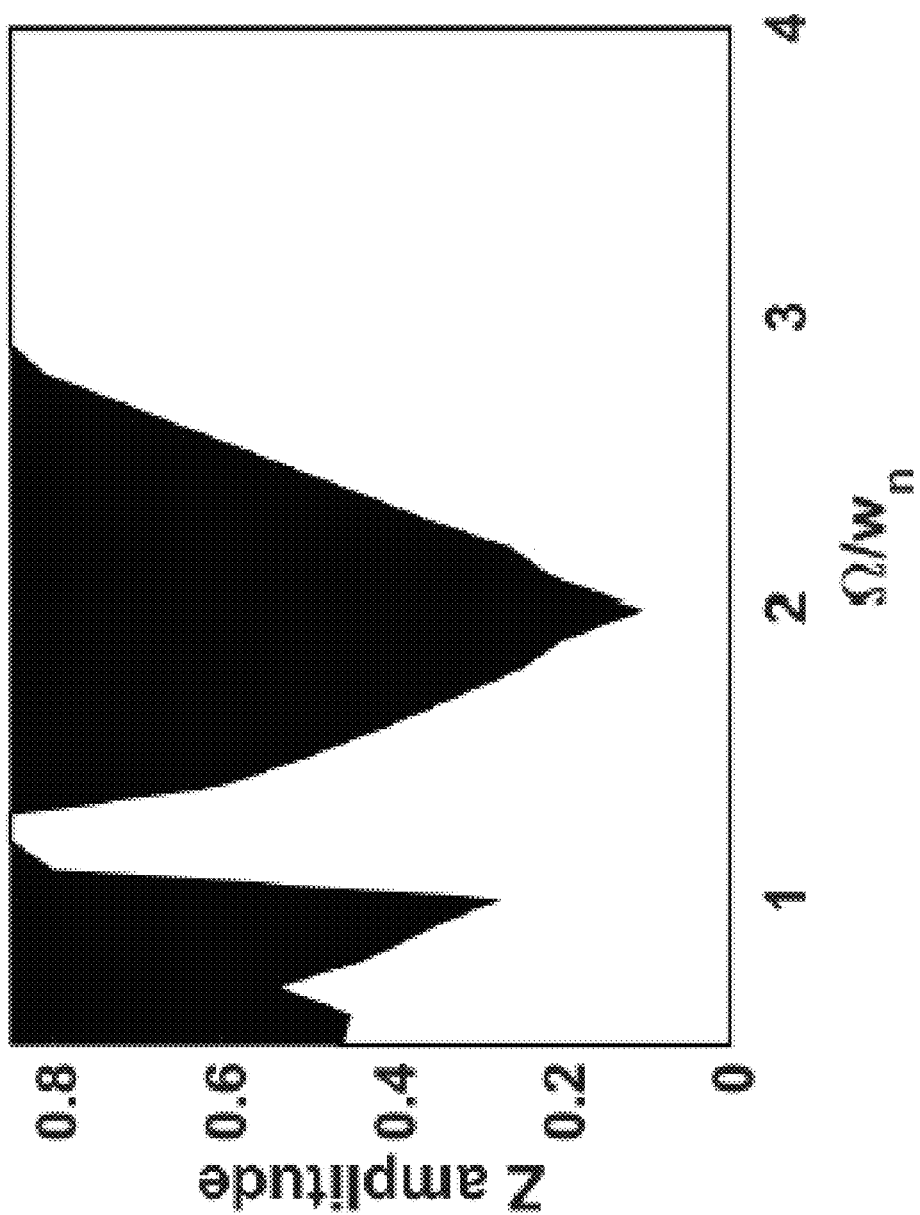
FIG. 3 is a graph showing black regions indicating unstable motions of the parametric excited pitch-surge modes.

For the pitch-surge coupled motion, the parametric excitation term excites the pitch motion. The effect of this excitation depends on the heave motion amplitude and frequency. It is also affected by the system damping in the pitch and surge modes. This parametric excitation may cause instability in the pitch-surge modes. Few references have addressed this issue. Zaghari et al. studied the case of a two degree-of-freedom damped mass-spring system where one of the degrees-of-freedom is externally parametric excited. The study shows that a small parametric excitation can produce large response when the system is subject to a frequency equal to double one of its natural frequencies. B. Zaghari et al., "Energy harvesting using parametric excitation," Theme Conference, United Kingdom, May 2014. Villegas and van der Schaaf describe the effect of parametric excitation on increasing the pitch motion which in turn may affect the heave energy absorption. See C. Villegas and H. van der Schaaf, "Implementation of a pitch stability control for a wave energy converter," *Proc. 10th Euro. Wave and Tidal Energy Conf.* Southampton, U K, 2011. To see this effect, a numerical simulation is conducted on the WEC system described below, where the values of the heave motion amplitude and frequency are varied. The stability of the pitch-surge motion is then examined. FIG. 3 shows the regions of instability (black regions), where the vertical axis is the heave amplitude and the horizontal axis is the normalized heave frequency. In general, as the heave motion amplitude increases, more parts in the range of the heave motion frequency, $\Omega$, become unstable. Also, when the heave motion frequency ($\Omega$) is twice the natural frequency of the pitch-surge motion ($\omega_n$), the system goes to an unstable region at lower values of the heave amplitude. As can be expected, as the operation point approaches the unstable boundaries, the pitch motion becomes larger and more energy can be absorbed in the pitch-surge modes; this will be described in the Discussion section below. However, when the pitch motion is large, attention should be paid to the heave motion since the linear uncoupled heave model might be violated in larger pitch motions. The description below assumes the heave motion is uncoupled and develops a numerical algorithm to implement a Model Predictive Control (MPC) for the pitch-surge modes.

Figure 4:
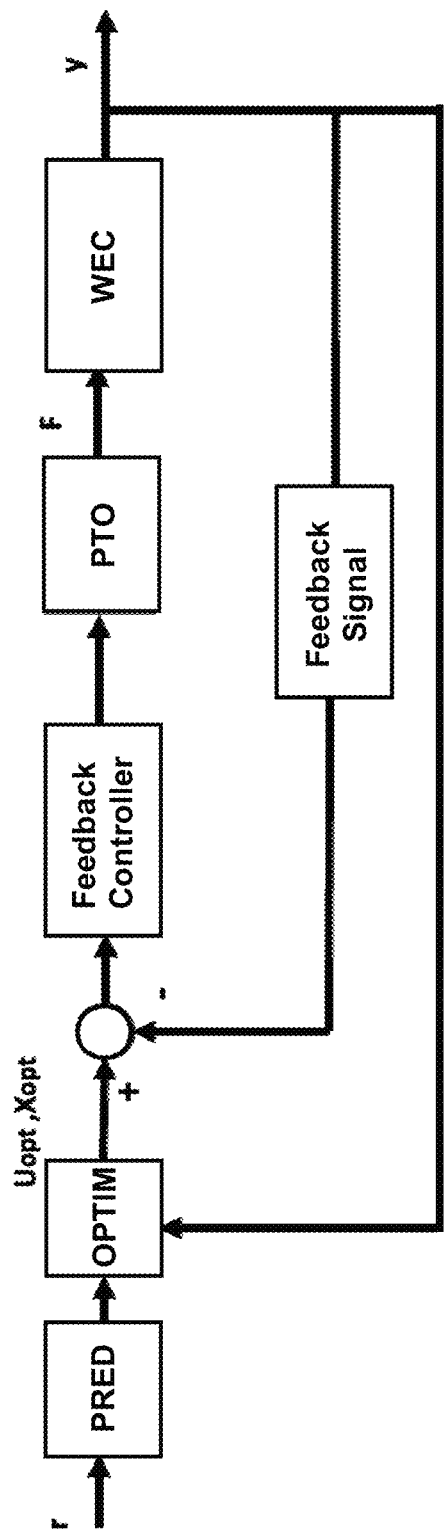
FIG. 4 is a diagram of the basic structure for a receding horizon or MPC control system.

The basic structure for a receding horizon or MPC control system is shown in FIG. 4. The basic structure can use both a feedforward block and an inner feedback loop. The block labeled PRED refers to the prediction part of feedforward control based on a reference signal r, which can be the wave excitation force. The prediction block predicts the value of the excitation force over a time horizon, which is used to optimize the PTO input. OPTIM refers to the MPC optimizer used to generate the optimal control force, position and velocity information ($U_{opt}$, $X_{opt}$) based on wave prediction. MPC employs optimization during execution to determine the control signal. The receding horizon procedure is repeated iteratively to compensate for disturbances and imperfect modeling by updating the current state of the system every time the optimization is carried out. Feedback refers to the fact that the output signal y can be measured and fed back to the control system that continuously reacts, based on current and past measurements, according to the control objective. With the receding horizon structure, a control decision is computed based on predictions over some finite future time. The current system state is measured and fed back as initial conditions at each time step in the controller computation.

3-DOF WEC Control Optimization

First, the control is developed for a WEC in a regular wave in the absence of parametric excitation, for simplicity of the presentation, then it is generalized to the case of a parametric excited WEC in an irregular wave. For a non-parametric excited WEC in a regular wave, the damping matrix [C] is constant. Note that the damping matrix [C] includes both the viscous damping coefficients $[B_v]$ in addition to the radiation damping coefficients. This pitch-surge system can be optimized using the MPC approach. The objective is to maximize the energy conversion over a given prediction time horizon:

$$\text{Min } J = \int_0^T L \, dt = \int_0^T -\vec{u}^T \dot{\vec{x}} \, dt \tag{14}$$

Define the vector $\vec{y} = \dot{\vec{x}}$. Let $\vec{\lambda}$ be the co-state vector associated with the states $\vec{x}$ and let $\vec{\beta}$ be the co-state vector associated with the states $\vec{y}$. The Hamiltonian is defined as:

$$H = L + \vec{\lambda}^T \dot{\vec{x}} + \vec{\beta}^T \dot{\vec{y}} \tag{15}$$
$$= -\vec{u}^T \vec{y} + \vec{\lambda}^T \vec{y} + \vec{\beta}^T \ddot{\vec{x}}$$

It is possible to solve for $\ddot{\vec{x}}$ using Eq. (11):

$$\ddot{\vec{x}} = [M]^{-1}\left(\vec{F}_e + \vec{u} - [C]\dot{\vec{x}} - [K]\vec{x}\right) \tag{16}$$
$$= [M]^{-1}\left(\vec{F}_e + \vec{u} - [C]\vec{y} - [K]\vec{x}\right)$$

Substituting from Eq. (16) into Eq. (15):

$$H = \vec{u}^T \vec{u} + \vec{\lambda}^T \vec{y} + \vec{\beta}^T [M]^{-1}\left(\vec{F}_e + \vec{u} - [C]\vec{y} - [K]\vec{x}\right) \tag{17}$$
$$= \left(-\vec{\beta}^T [M]^{-1}[K]\right)\vec{x} + \left(-\vec{u}^T + \vec{\lambda}^T - \vec{\beta}^T [M]^{-1}[C]\right)\vec{y} +$$
$$\vec{\beta}^T [M]^{-1}\left(\vec{F}_e + \vec{u}\right)$$

The necessary conditions for optimality are:

$$\frac{\partial H}{\partial x_i} = -\dot{\lambda}_i, \quad \frac{\partial H}{\partial y_i} = -\dot{\beta}_i \tag{18}$$
$$\frac{\partial H}{\partial \lambda_i} = -\dot{x}_i, \quad \frac{\partial H}{\partial \beta_i} = -\dot{y}_i, \quad \frac{\partial H}{\partial u_i} = 0, \forall i$$

Computing the partial derivatives and substituting into Eq. (18) yields:

$$\dot{\vec{\lambda}} = [K]^T [M]^{-T} \vec{\beta} \tag{19}$$

$$\dot{\vec{\beta}} = \vec{u} + [C]^T [M]^{-T} \vec{\beta} - \vec{\lambda} \tag{20}$$

$$\dot{\vec{x}} = \vec{y} \tag{21}$$

$$\dot{\vec{y}} = [M]^{-1}\left(\vec{F}_e \vec{u} - [C]\vec{y} - [K]\vec{x}\right) \tag{22}$$

$$\frac{\partial H}{\partial \vec{u}} \equiv [M]^{-T} \vec{\beta} - \vec{y} = \vec{0} \tag{23}$$

Eqs. (19)-(23) are the final form of the optimality necessary conditions for a 3-DOF WEC in a regular wave in the absence of parametric excitation. To solve these equations, a numerical optimization method is used to search for the optimal solution as described here. This approach is based on using a first order gradient method to find a numerical solution for the optimality necessary conditions, as described by Bryson and Ho, and used by Pcolka et al. to implement a MPC for building climate control. See J. A. E. Bryson and Y.-C. Ho, *Applied Optimal Control optimization, estimation and control*, CRC Press, (1975); and M. Pcolka et al., *Control Eng. Pract.* 53, 124 (2016). This approach needs an initial guess for the control; and the obtained optimal solution is sensitive to this initial guess. Starting from an initial guess of the optimal input profile $u_o(t)$, the states $\vec{x}$ and $\vec{y}$ can be computed using Eqs. (21)-(22). Also, the co-states $\vec{\lambda}$ and $\vec{\beta}$ can be computed using Eqs. (19)-(20). The values of $\partial H/\partial u$, can be computed using Eq. (23), which in general will not be zero. The initial guess for the control can then be updated using the equation:

$$\Delta u_i = -\alpha \frac{\partial H}{\partial u_i} \tag{24}$$

where $\alpha$ is a positive scalar constant. The updated control is used as a new guess and the above process repeats until convergence. The convergence criteria are that $|\Delta J(l)| \leq \varepsilon$, where $\Delta J(l) = J(l) - J(l-1)$, and $\varepsilon$ is nonnegative tolerance. There are a few methods to choose the search step $\alpha$; one way is to select the search step as:

$$\alpha(l) = -\wp \log(\gamma \Delta J(l)) \tag{25}$$

at each iteration l, where $\wp, \gamma$ are tuning parameters.

For the more general case of a parametric excited WEC in irregular waves, the dynamic model is augmented by the radiation state space model, defined as:

$$\dot{\vec{x}}_r = [A_r]\vec{x}_r + [B_r]\vec{y} \tag{26}$$

The co-state vector associated with $\vec{x}_r$ is $\vec{\lambda}_r$. In this irregular wave case, the radiation force is not a constant-coefficients damping; it is computed as function of the radiation states. Hence, in this case the matrix [C] is replaced with the constant viscous damping matrix $[B_v]$, while the radiation force is computed as function of the radiation states $\vec{x}_r$. The Hamiltonian function in this case can be shown to be (see Eq. (17)):

$$H = (-\vec{u}^T + \vec{\lambda}^T)\vec{y} + \vec{\lambda}_r^T([A_r]\vec{x}_r + [B_r]\vec{y}) + \vec{\beta}^T[M]^{-1}(\vec{F}_e + \vec{u} - [B_v]\vec{y} - [C_r]\vec{x}_r - [K]\vec{x}) \tag{27}$$

The necessary conditions for optimality for irregular waves become:

$$\dot{\vec{\lambda}} = [K]^T [M]^{-T} \vec{\beta} \tag{28}$$

$$\dot{\vec{\beta}} = \vec{u} + [C]^T [M]^{-T} \vec{\beta} - \vec{\lambda} - [B_r]^T \vec{\lambda}_r \tag{29}$$

$$\dot{\vec{\lambda}}_r = [C_r]^T [M]^{-T} \vec{\beta} - [A_r]^T \vec{\lambda}_r \tag{30}$$

$$\dot{\vec{x}} = \vec{y} \tag{31}$$

$$\dot{\vec{y}} = [M]^{-1}\left(\vec{F}_e + \vec{u} - [B_v]\vec{y} - [C_r]\vec{x}_r - [K]\vec{x}\right) \tag{32}$$

-continued $$\frac{\partial H}{\partial \vec{u}} \equiv [M]^{-T}\vec{\beta} - \vec{y} = \vec{0} \quad (33)$$

The same optimizer that is used in the simpler case above can be used here also to search for the solution that satisfies the necessary conditions for optimality for parametric excited WECs in irregular waves.

The process of computing the control is as follows. A receding horizon of length $T_H$ seconds is assumed. Assume an initial guess for the control over this horizon, $\vec{u}_0(t)$ where $t: 0 \to T_H$. Given an initial state vector of the buoy, $\vec{x}_r$ and $\vec{y}_r$, and the control over the horizon, the states can be propagated forward in time to compute the states over the horizon, using Eqs. (21) and (22) for regular waves (or Eqs. (31) and (32) for irregular waves). For this fixed end time optimal control problem, the final values for co-states at final time are zeros; that is $\vec{\lambda}(t_0+T_H)=\vec{\beta}(t_0+T_H)=\vec{0}$. See J. A. E. Bryson and Y.-C. Ho, *Applied Optimal Control optimization, estimation and control*, CRC Press, (1975). Given the initial guess of the control over the horizon, and the final values of the co-states, the co-states are propagated backward in time, to compute the co-states at all times in the horizon, using Eqs. (19) and (20) for regular waves (or Eqs. (28) and (29) for irregular waves). So far, 4 out of the 5 necessary conditions for optimality are satisfied (in both the regular and irregular waves cases). Using the computed $\vec{\beta}$ and $\vec{y}$, the last necessary condition (Eq. (23) for regular waves and Eq. (33) for irregular waves) is checked. If it is satisfied within a tolerance, then the process terminates and the current guess of the control $\vec{u}$ is the solution. If not, then the current guess of the control is updated using Eq. (24). The new control is used again to propagate the states and co-states, as described above, then the satisfaction of the fifth necessary condition is checked. The process repeats until convergence. Once converged, only the value of the control at the current time is used to propagate the system states in the WEC simulator for one control time step forward. At the next control time step, the above process of searching for the optimal control is repeated over a new time horizon that starts at the new time.

Numerical Tests

One might consider dropping the parametric excitation term since it is the product of the heave motion $d_3$ and the pitch motion $\theta_5$. However, it is shown below that the parametric excited dynamic model produces more energy. To highlight the impact of the parametric excitation term, the parametric excitation term is first dropped and the corresponding numerical results are shown below. Then the parametric excitation term is added and the corresponding numerical results are presented.

Figure 5:
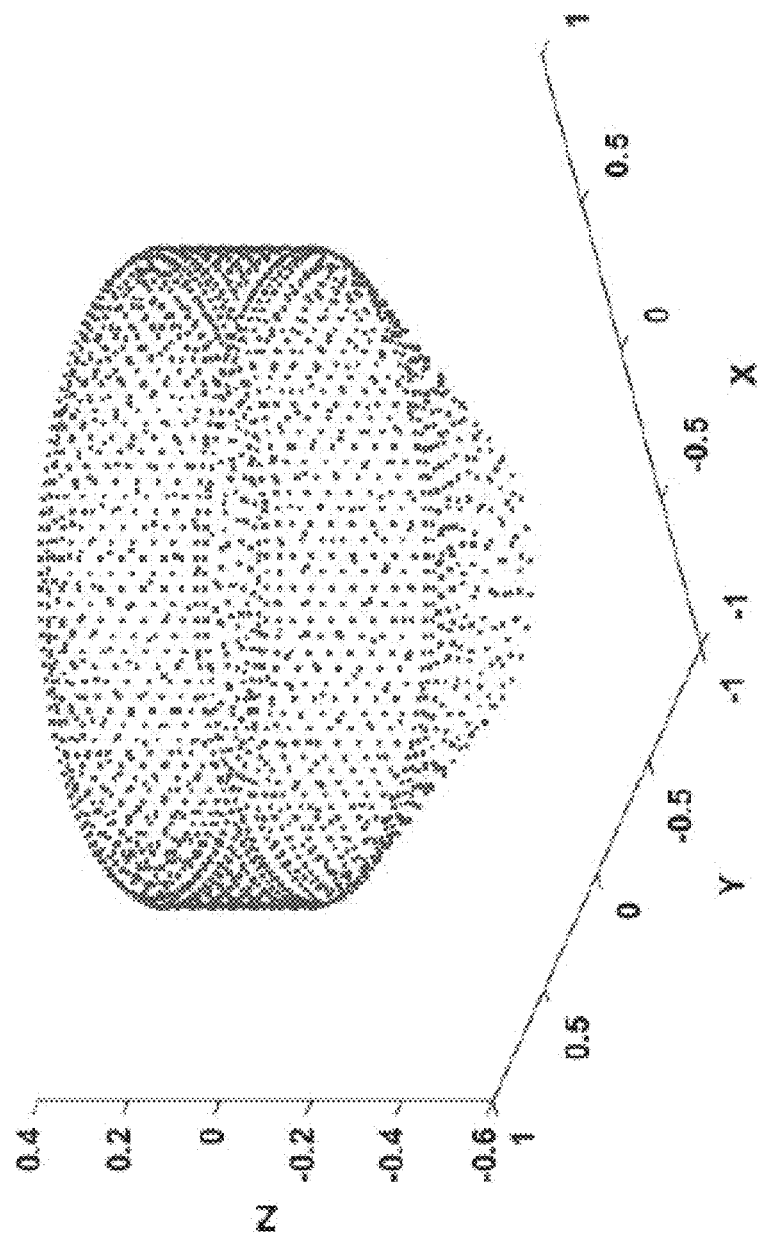
FIG. 5 is a schematic illustration of a buoy.

All the numerical tests were conducted on the buoy shown in FIG. 5. See D. Bull et al., "Design of a physical point-absorbing wec model on which multiple control strategies will be tested at large scale in the mask basin," *International Offshore and Polar Engineering Conference* (ISOPE2015), 2015. The radius of the cylindrical part of the buoy is 0.8604 m, and its cross-sectional area is 2.3257 m². The height of the buoy is 0.7294 m, and the total volume is 0.8578 m³. The mass of the buoy is 858.3987 kg.

Both a regular wave case and a Bretschneider wave case are tested. For the regular wave case, the wave amplitude is 0.6 m. The receding horizon length is 0.2 seconds. The control time step is 0.01 seconds. For the optimization algorithm described above, the algorithm parameters are selected for the regular wave as follows: $-\wp=1000$, $\gamma=150$, and the range of a is between 0.01-200. For the Bretschneider wave, the receding horizon length is 0.4 seconds. The control time step is 0.01 seconds. A high limit is selected for the control, 8×4 N for surge and 8×4 N.m. for pitch. For the optimization algorithm described above, the algorithm parameters are selected for the Bretschneider wave as follows: $-\wp=2000$, $\gamma=150$, and the range of $\alpha$ is between 0.01-500.

No Parametric Excitation

Figure 6:
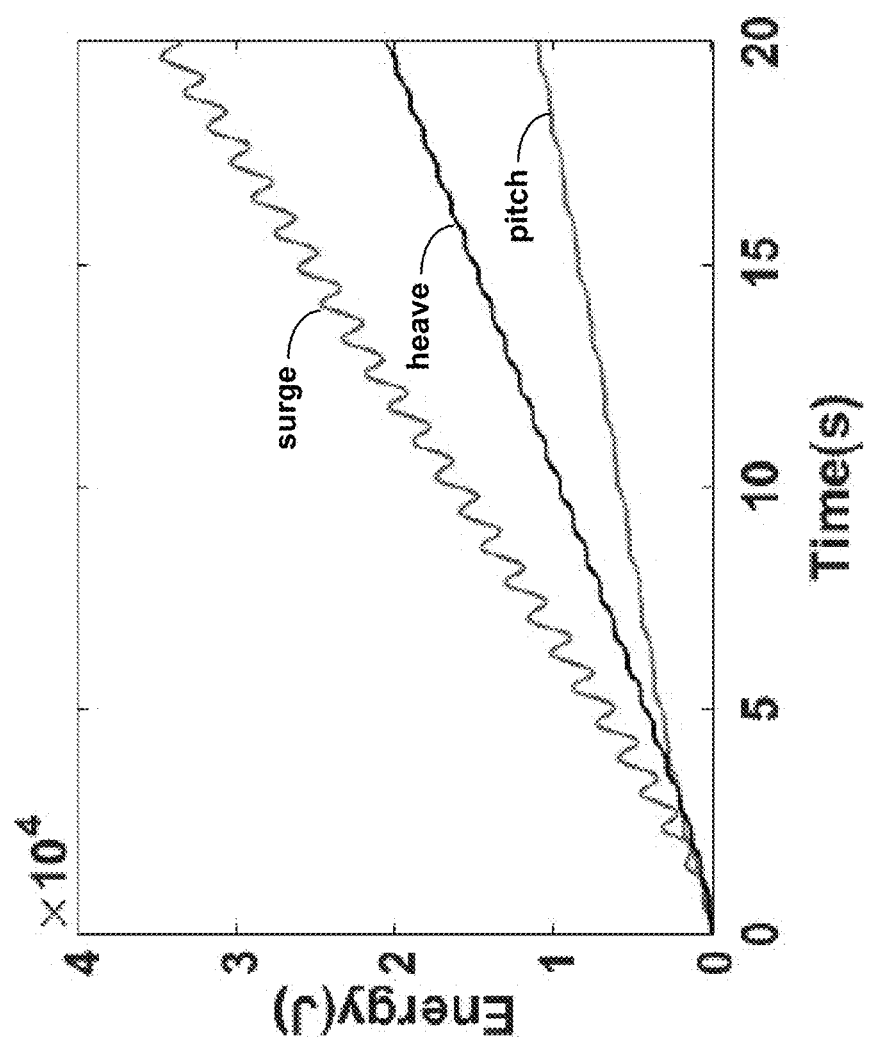
FIG. 6 is a graph showing the energy extracted in pitch and surge compared to heave extracted energy with no parametric excitation.
Figure 7:
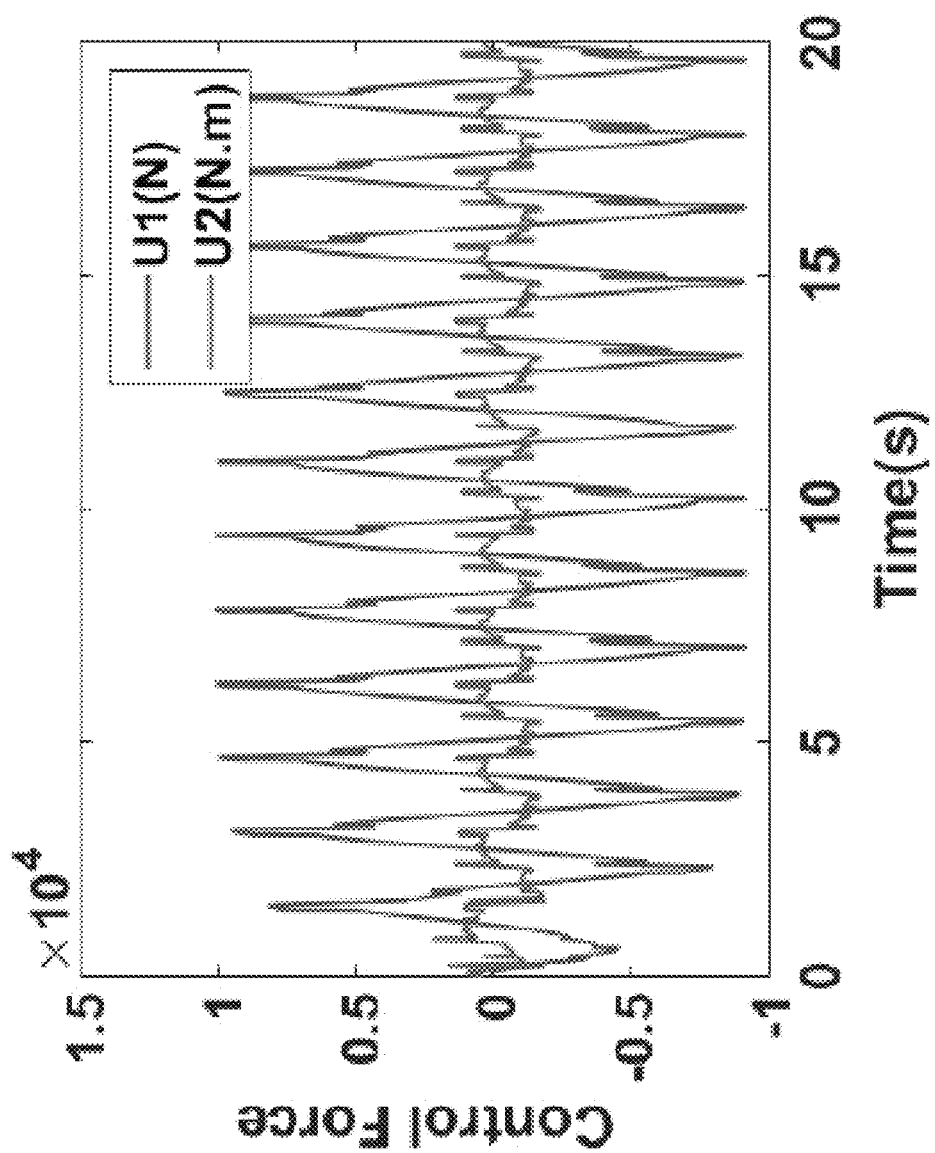
FIG. 7 is a graph of the control force in pitch (U2) and surge (U1).
Figure 8:
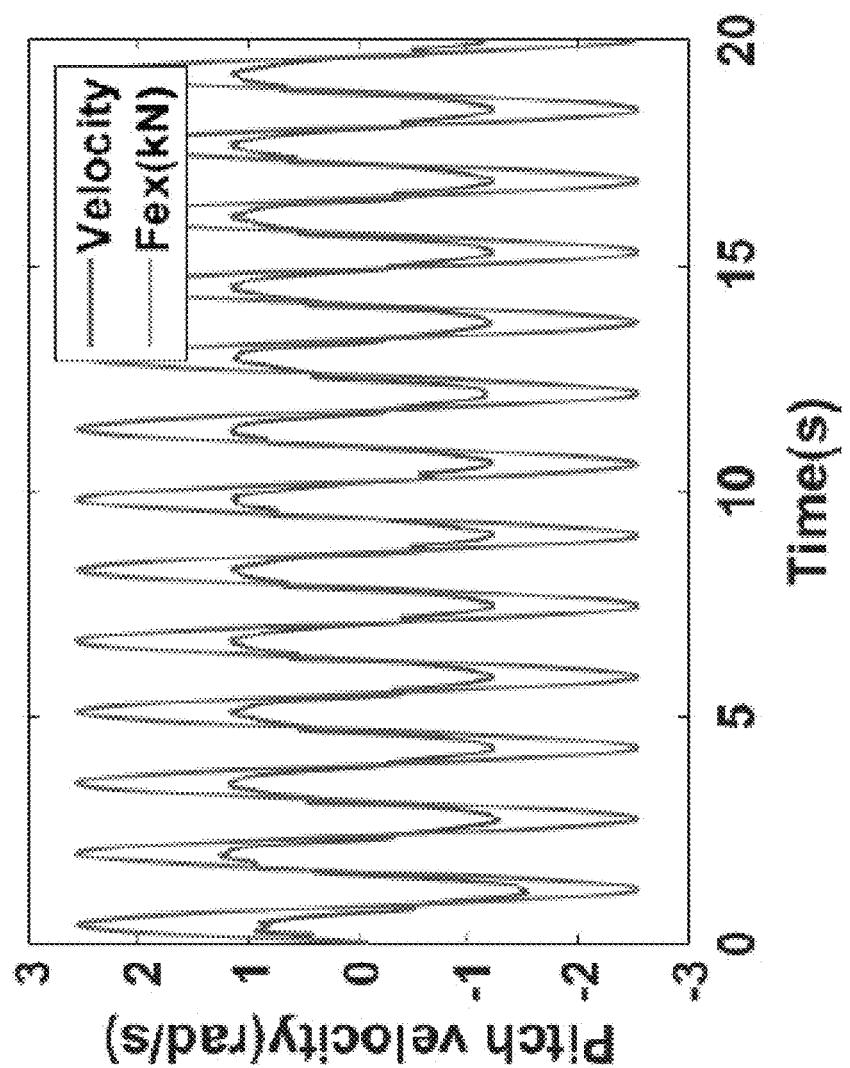
FIG. 8 is a graph of the velocity of pitch motion.
Figure 9:
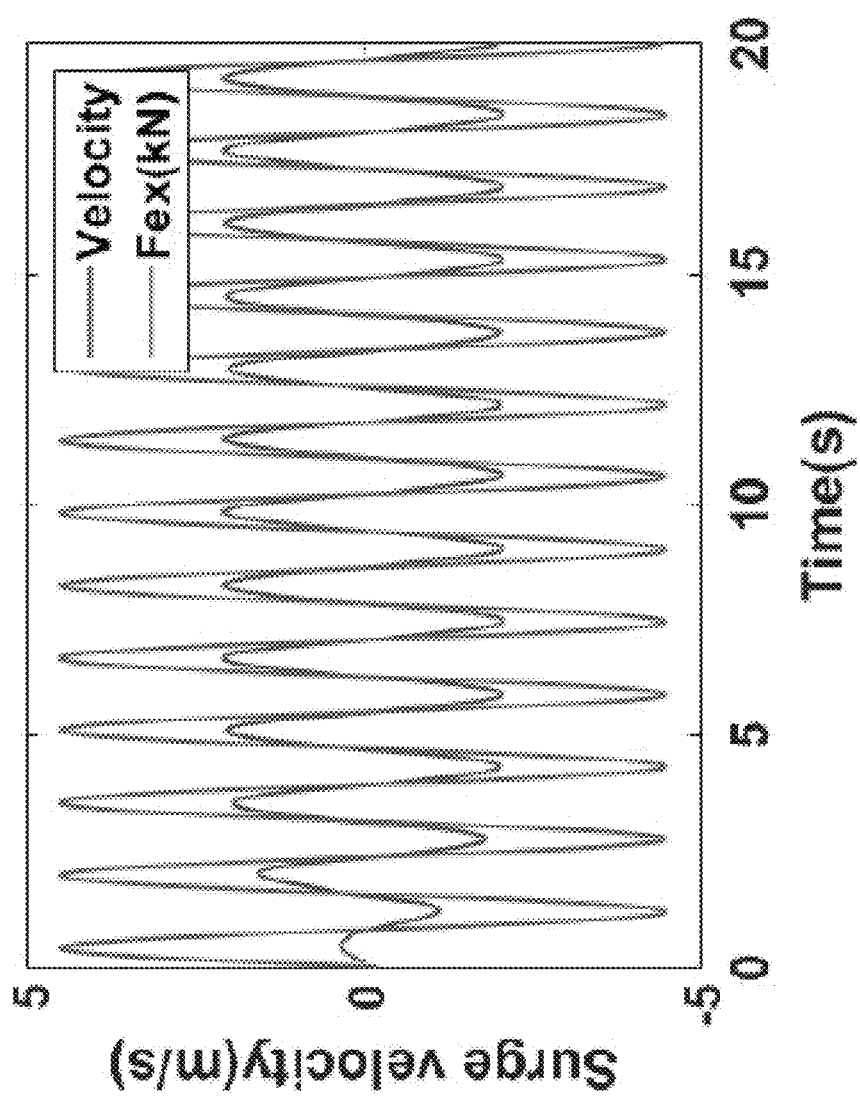
FIG. 9 is a graph of the velocity of surge motion.

Assuming a regular wave, FIG. 6 shows the energy harvested when there is no parametric excitation. As can be seen in this figure, the total harvested energy in pitch, heave, and surge modes is a little higher than three times the energy harvested in the heave mode only. The corresponding control force in this case is shown in FIG. 7. The velocity in both pitch and surge modes are plotted in FIGS. 8 and 9, respectively, along with the scaled excitation force, to highlight the resonance achieved by the control in this case.

Parametric Excited Surge-Pitch Motion

Figure 10:
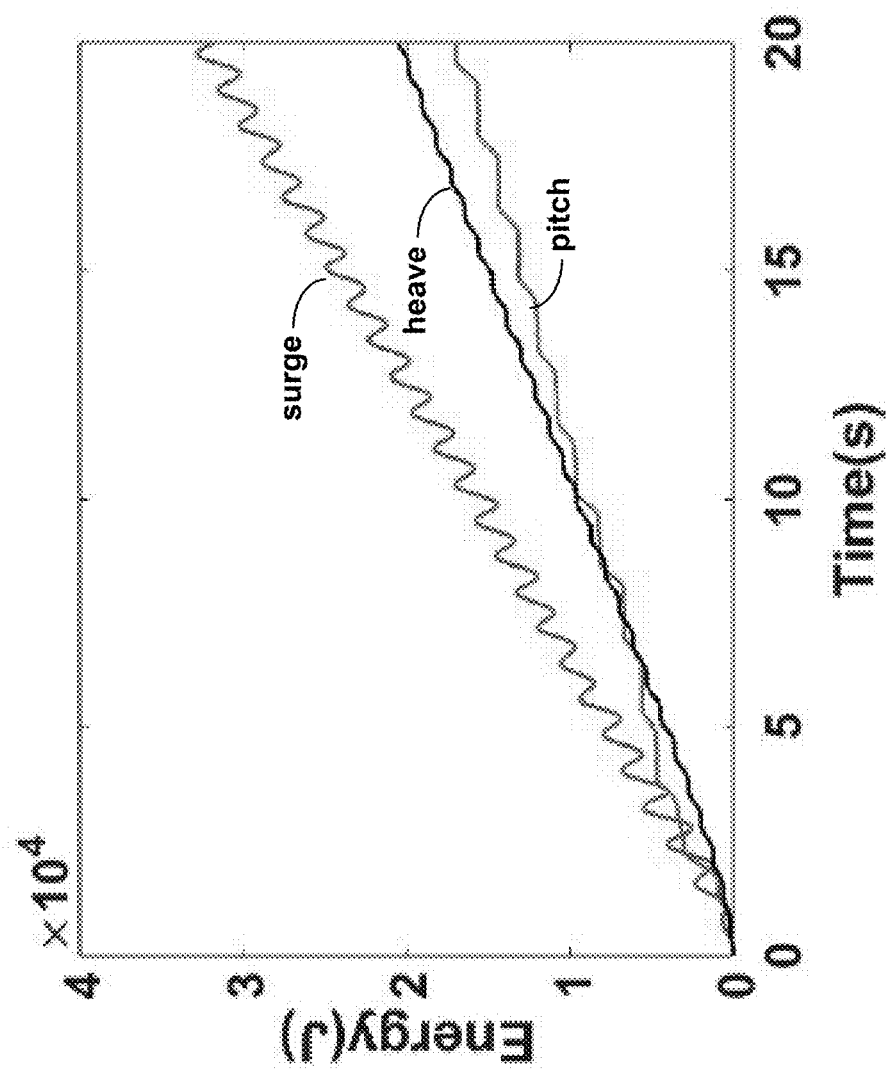
FIG. 10 is a graph showing the energy extracted in pitch and surge compared to heave extracted energy with parametric excitation.
Figure 11:
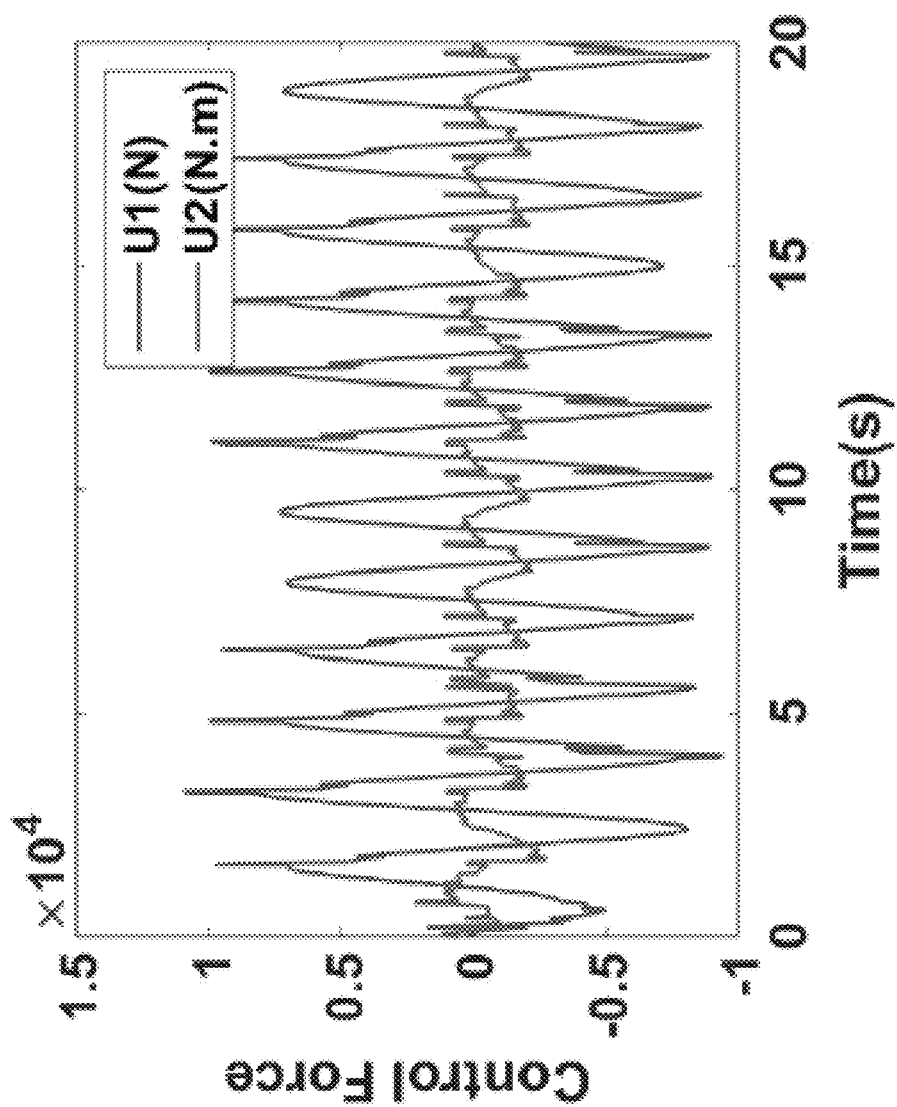
FIG. 11 is a graph of the control force in pitch (U2) and surge (U1).
Figure 12:
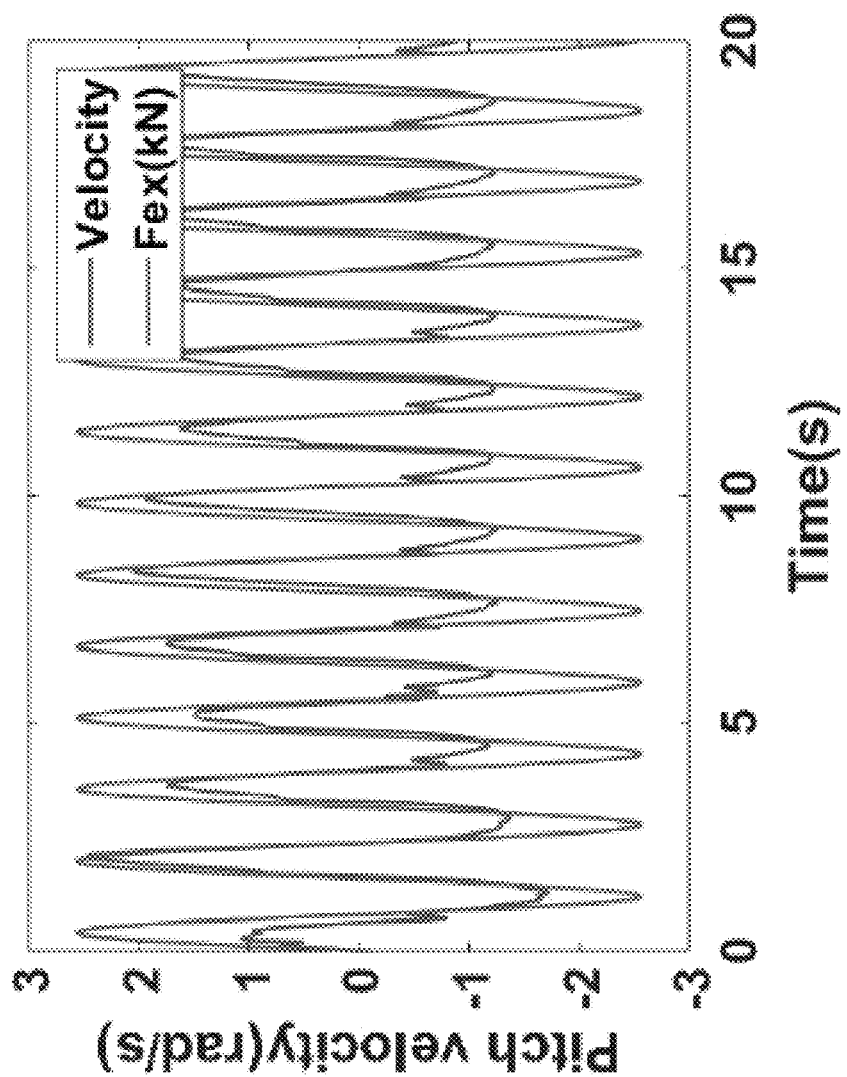
FIG. 12 is a graph of the velocity of pitch motion.
Figure 13:
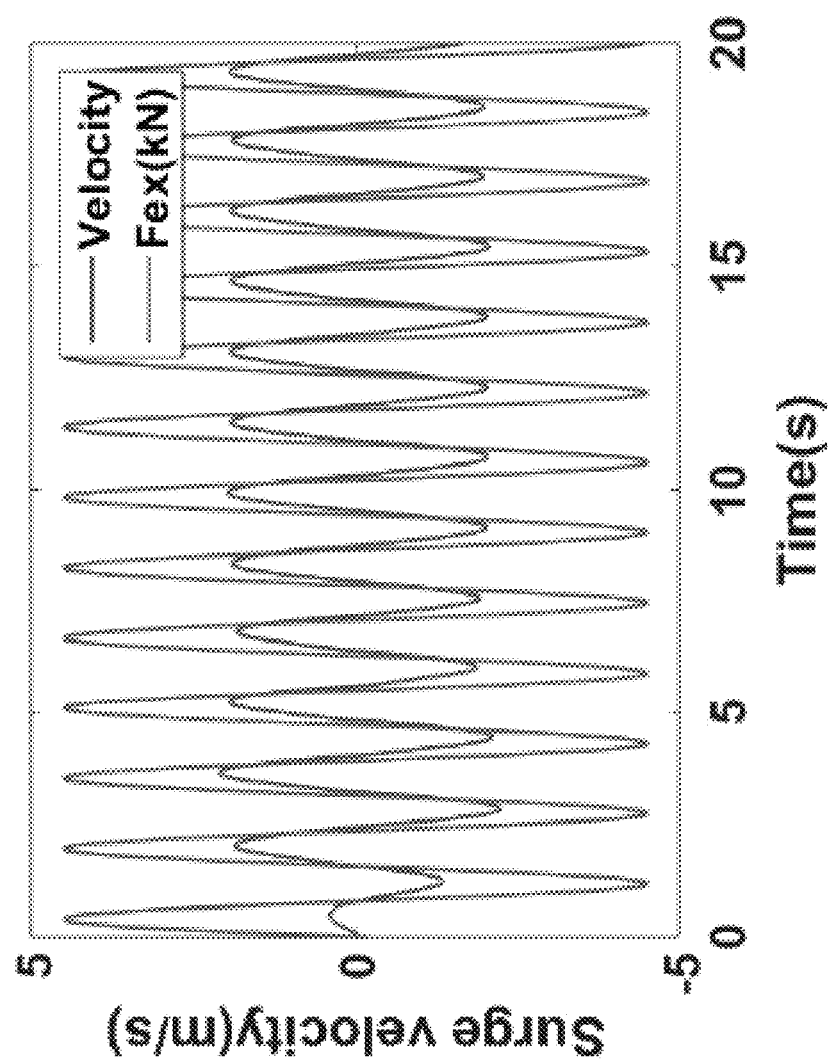
FIG. 13 is a graph of the velocity of surge motion.

FIG. 10 shows the harvested energy for the three modes when there is parametric excitation. The energy harvested in 20 seconds in surge mode is 3.2×10⁴ Joules and in pitch mode is 1.7×10⁴ Joules. This makes the total energy harvested in the three modes about 3.5 times the energy harvested in the heave mode alone (note that the energy harvested in the heave mode is the same as that without parametric excitation). This is higher than the energy harvested when then there is no parametric excitation. This higher energy harvesting can be attributed to the parametric excitation term in the dynamic model. In this regular wave, the energy increase due to the parametric excitation term is about 12%. FIG. 11 shows the control in both pitch and surge modes. The velocity in both pitch and surge modes is shown in FIGS. 12 and 13. Compared to the non-parametric excitation case, the surge control is slightly less while the pitch control is slightly higher. Note the energy in pitch is higher while the energy in surge is less, compared to the non-parametric excitation case.

Parametric Excited WEC in Bretschneider Wave

Figure 14:
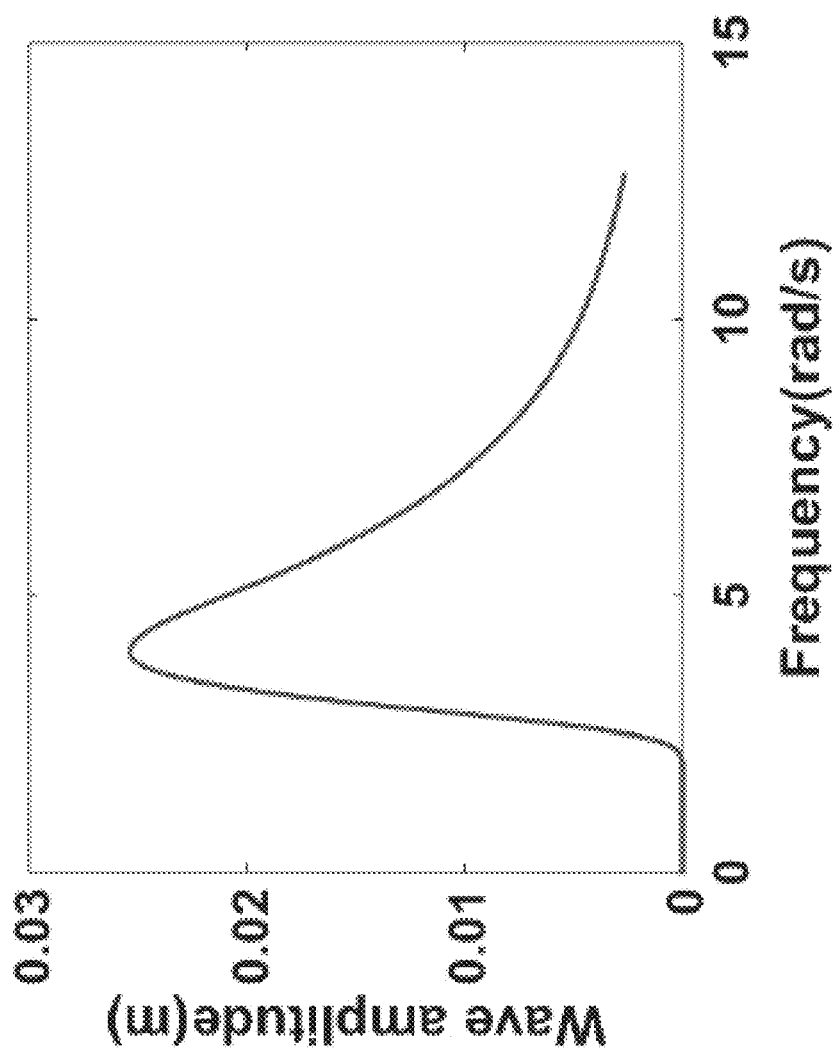
FIG. 14 is a graph of the Bretschneider wave amplitude.

For the Bretschneider wave case, the significant wave height is 1.2 m and the phase shift is random. The wave elevation used in this test is shown in FIG. 14.

Figure 15:
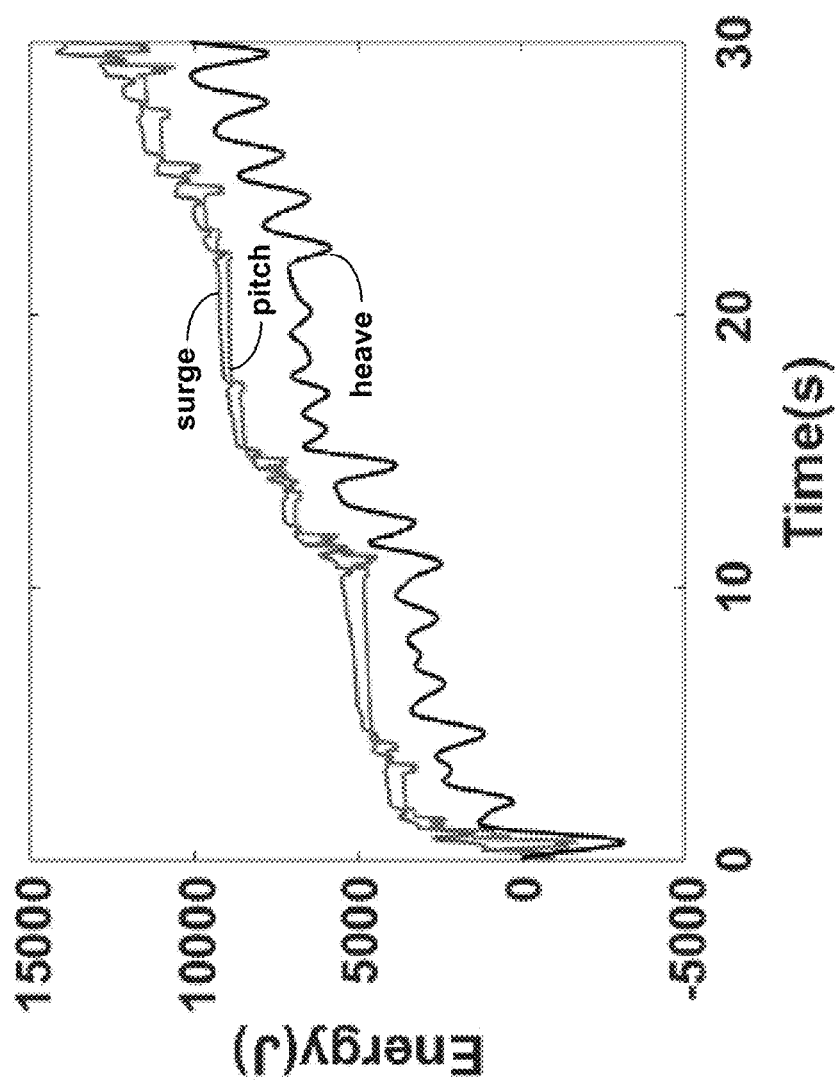
FIG. 15 is a graph showing that the total energy is about 3:8 times the energy harvested in heave mode only, for a parametric excited WEC in a Bretschneider wave.
Figure 16:
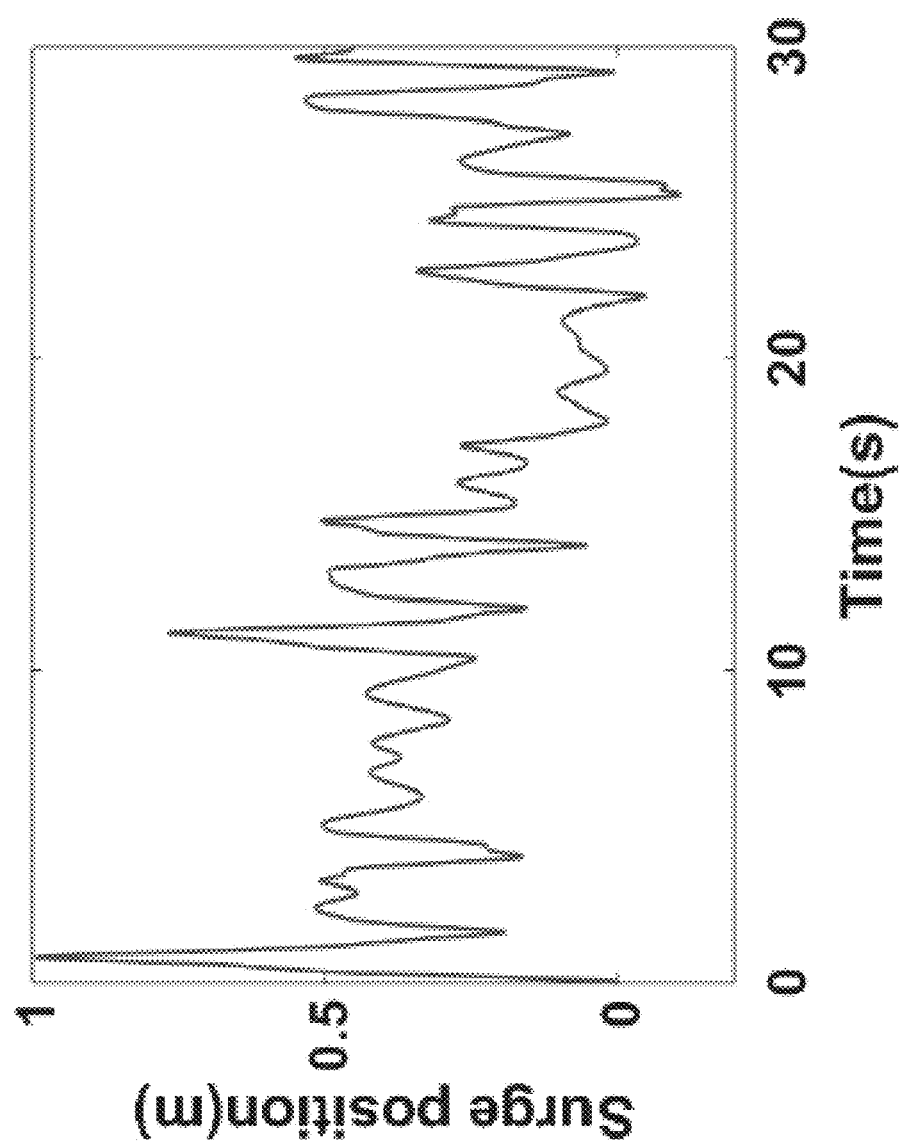
FIG. 16 is a graph of the surge position in a Bretschneider wave.
Figure 17:
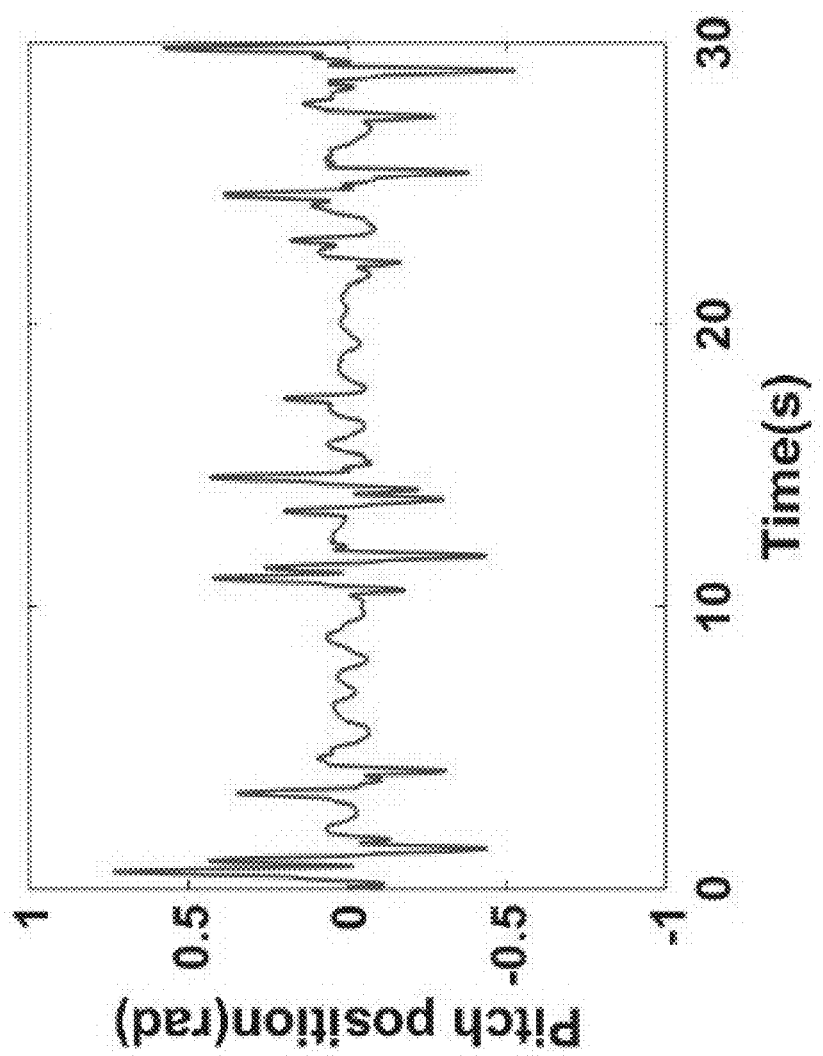
FIG. 17 is a graph of the pitch position in a Bretschneider wave.
Figure 18:
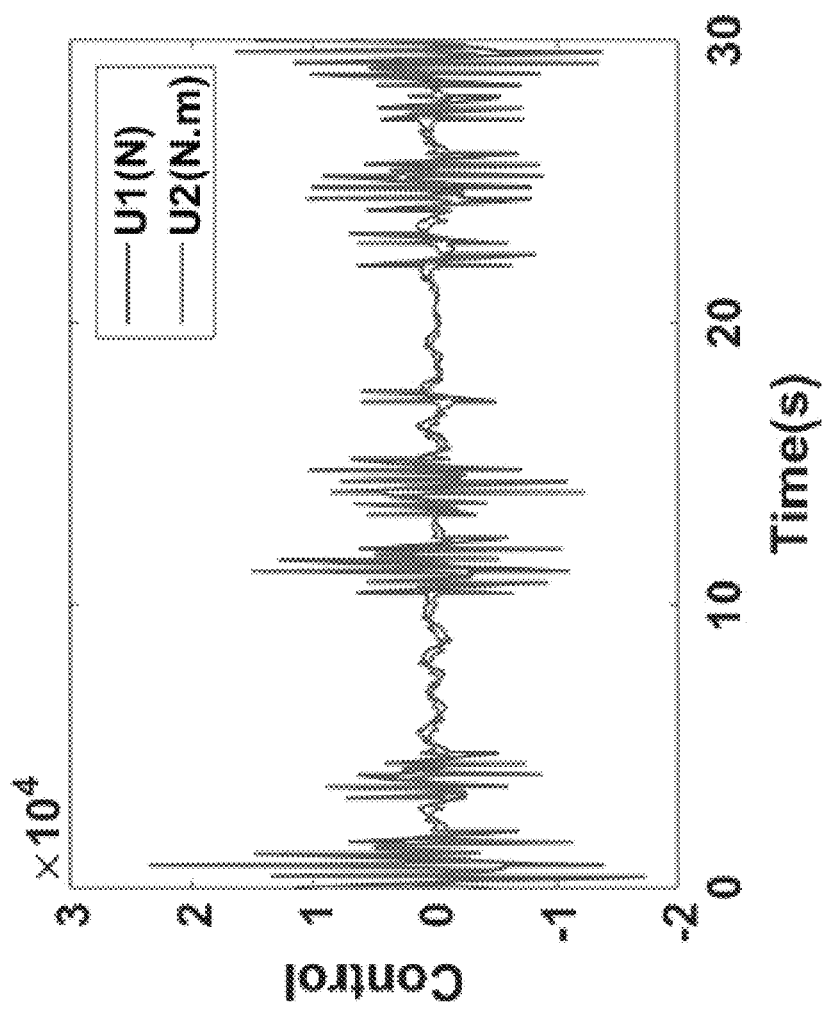
FIG. 18 is a graph of the control force in surge (U1) and pitch (U2) directions.

FIG. 15 shows the extracted energy in surge, pitch, and heave modes in this Bretschneider wave. Both pitch and surge actuators harvest more energy than the heave actuator. The harvested energy in the 3-DOF is about 3.8 times the harvested energy in the heave mode alone. FIGS. 16 and 17 show the surge and pitch positions, respectively. The maximum position for pitch is of particular importance in this case; since a large pitch motion causes the coupling between the heave and pitch, in the heave equation, to become big and hence cannot be neglected. In such case, the heave motion will not be uncoupled from the other two modes and the model used in these simulations will not be valid. As can be seen from FIG. 17, the maximum pitch is about 0.5 radians which is little below 30°. This range is acceptable in terms of the validity of the model used. The control forces along the pitch and surge modes are plotted in FIG. 18.

DISCUSSION

Figure 19:
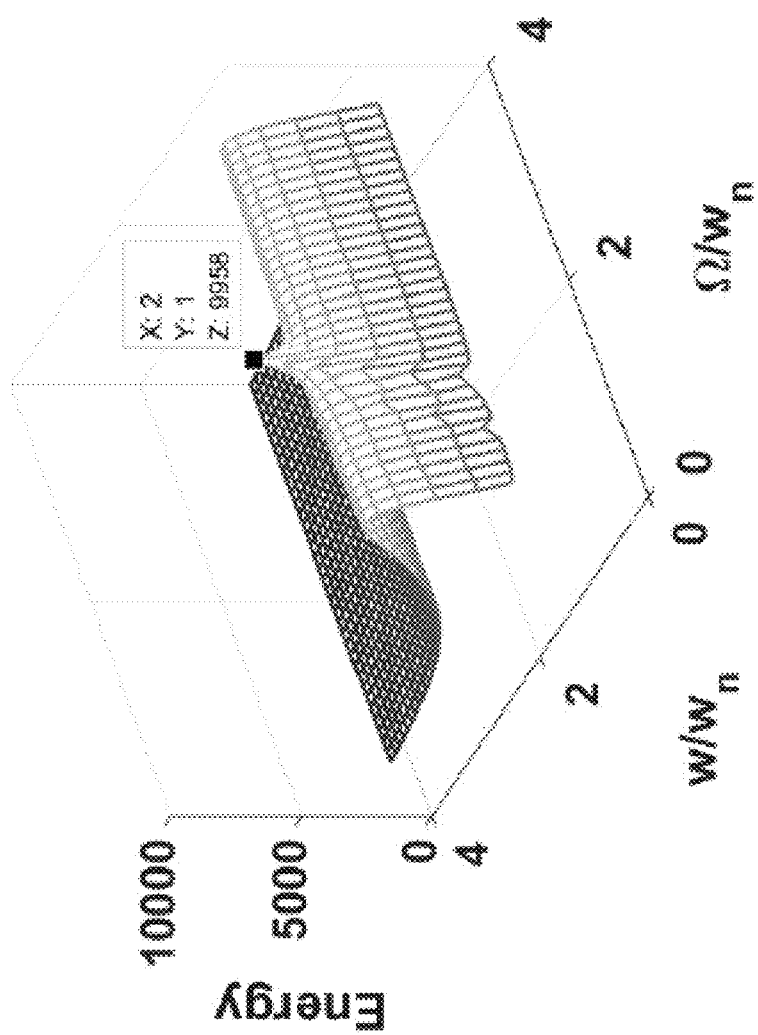
FIG. 19 is a graph of the pitch-surge energy absorption as function of the parametric excitation and excitation force frequencies.

The amplitude and frequency of the parametric excitation term (amplitude and frequency of the heave motion) impacts both the absorbed energy and the stability of the pitch-surge motions. Zaghari et al. conducted an analysis on a parametric excited mass-spring-damper system and shows that as the parametric excitation frequency ($\Omega$) approaches a value of twice the natural frequency of the system, the energy harvested increases until the system becomes unstable, depending on the parametric excitation amplitude. See B. Zaghari et al., "Energy harvesting using parametric excitation," *Theme Conference*, United Kingdom, May 2014. A numerical simulation is conducted on the WEC system to investigate the impact of changing the values of the heave motion amplitude and frequency on the stability and the absorbed energy of the pitch-surge modes. FIG. 19 shows the variation in the absorbed energy from the pitch and surge motions for a range of excitation force frequencies and parametric excitation frequencies. As can be seen in this figure, when the excitation frequency ($\omega$) is equal to the natural frequency of the system ($\omega_n$), the energy harvested is high. When this condition is maintained and as the heave frequency ($\Omega$) approaches twice the natural frequency of the system, the energy harvested also increases.

Figure 20:
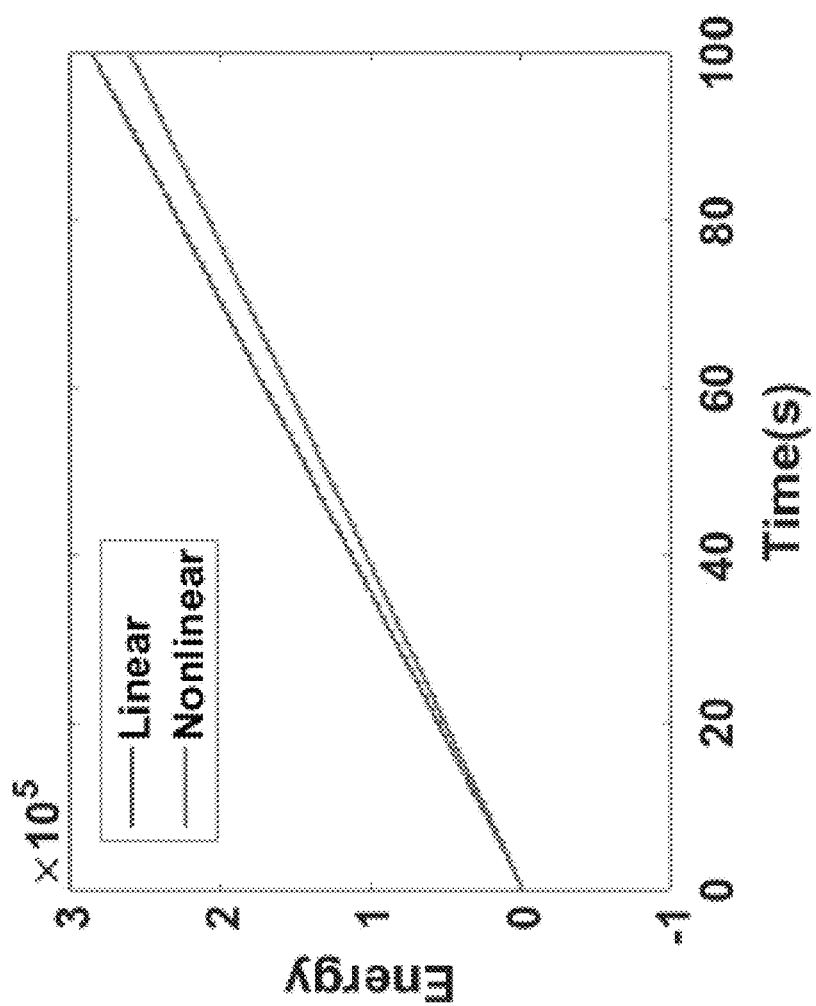
FIG. 20 is a graph showing that the energy absorption in pitch-surge motions using a linear model is close to that of the nonlinear model.
Figure 21:
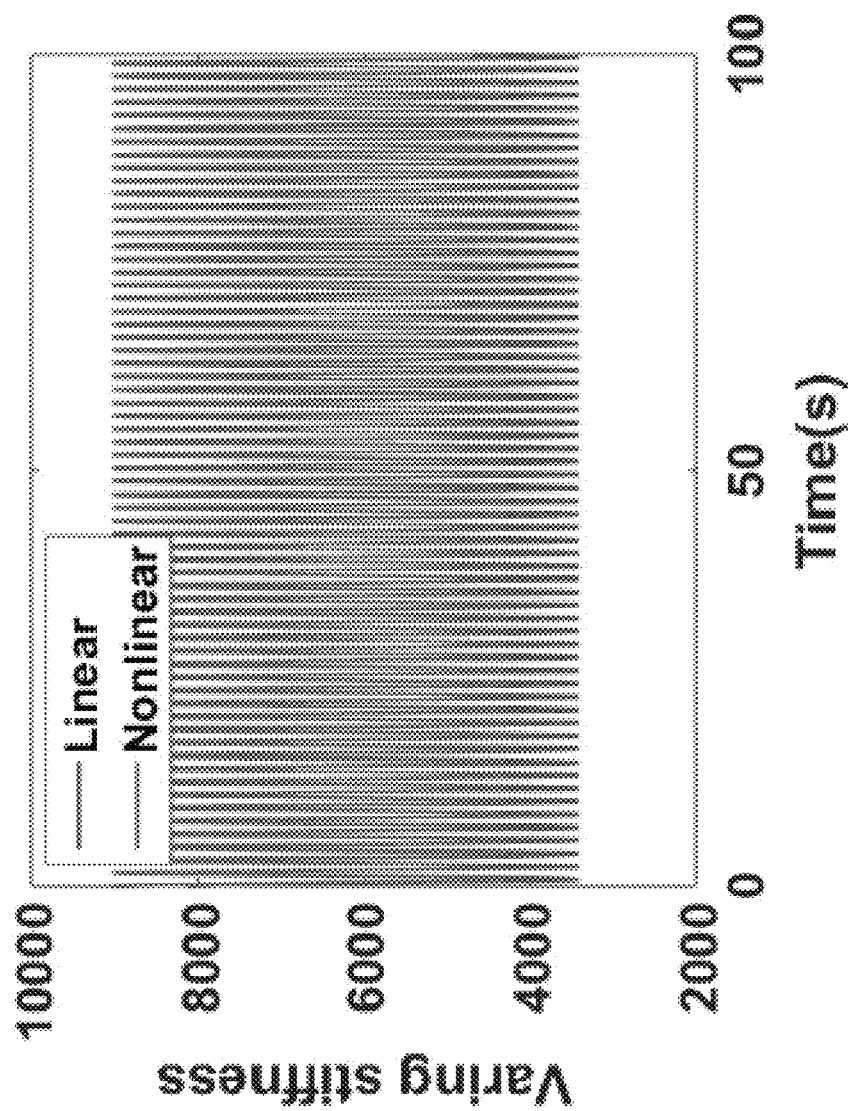
FIG. 21 is a graph showing that the first order parametric excitation is close to the second order parametric excitation terms.

In computing the control, the nonlinear model (Eqs. (8)-(10)) was linearized to Eq. (11). To show the impact of this linearization step on the calculated energy, the absorbed energy is simulated using the nonlinear and linear models using the same controller computed based on the linear model. FIG. 20 shows that the energy absorption in both cases are very close. FIG. 21 also shows that the higher order parametric excitation term in Eq. (12) is close to the approximated parametric excitation term in Eq. (13) which is adopted herein.

Figure 22:
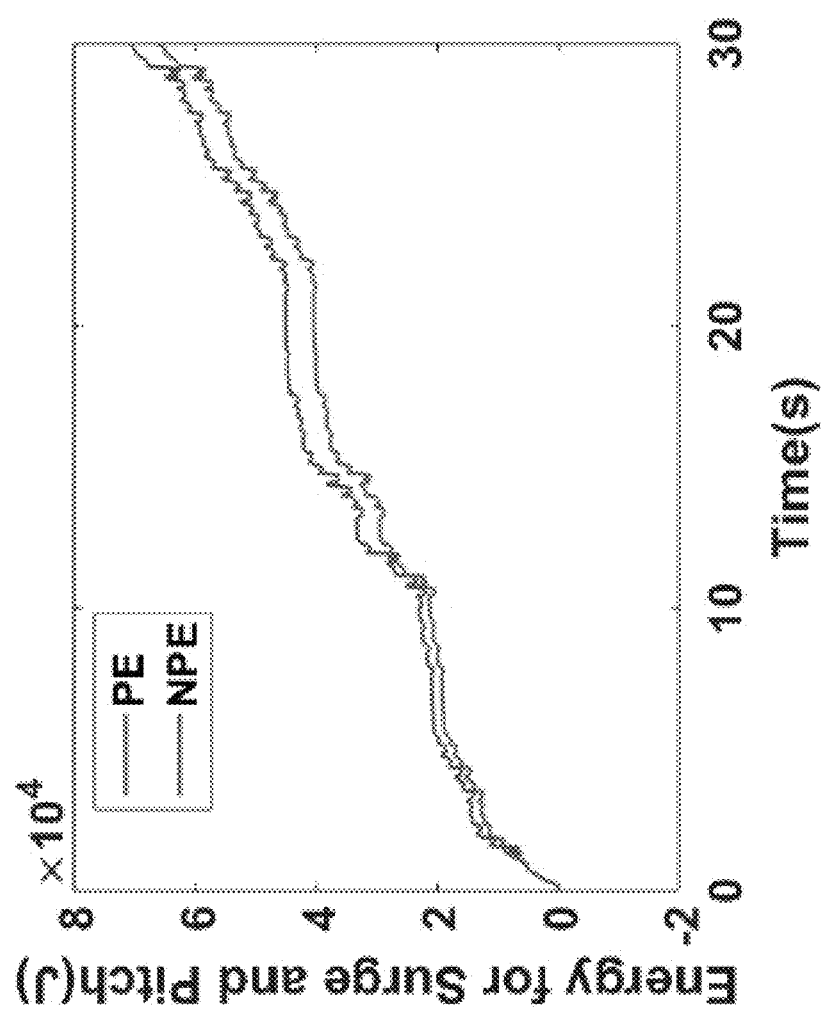
FIG. 22 is a graph showing a comparison between energy harvested in both parametric excited WEC and a linear WEC.
Figure 23:
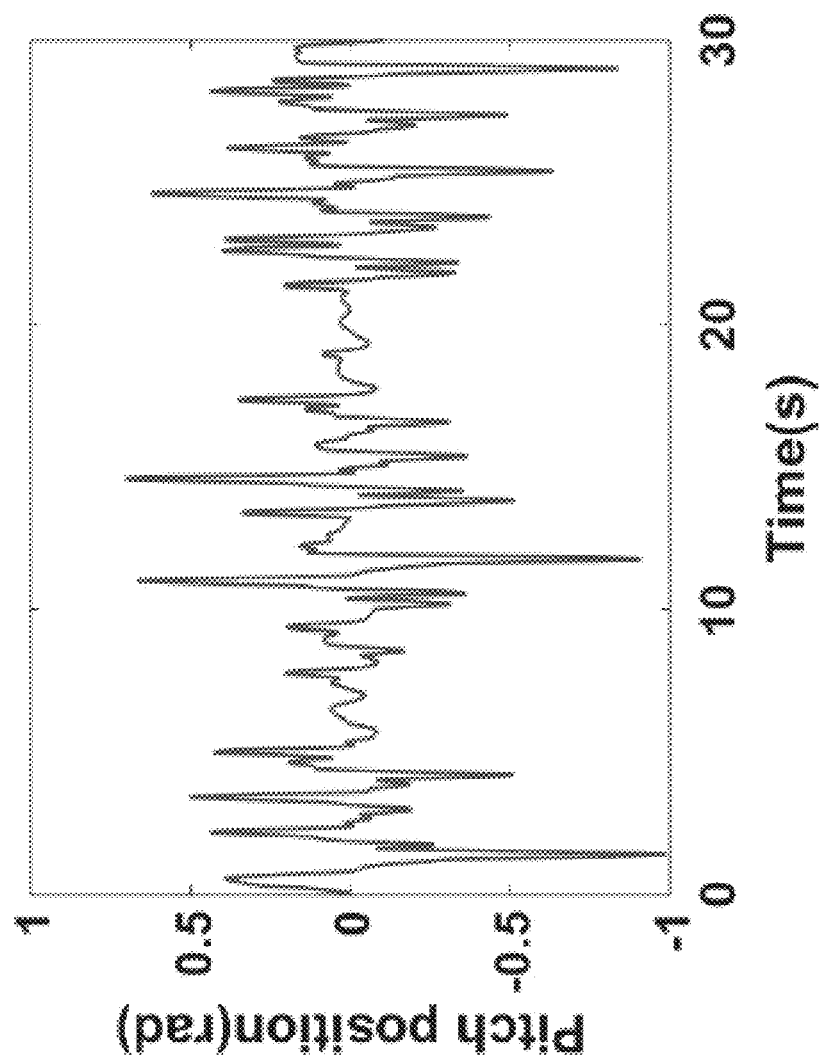
FIG. 23 is a graph of the pitch angle for the parametric excited WEC.

To highlight the impact of having parametric excitation in the case of a Bretschneider wave, a test is conducted twice, with and without parametric excitation. The significant wave height for this case is 2 m. FIG. 22 shows the energy harvested in both cases. There is a clear increase in the harvested energy when accounting for the parametric excitation despite the short simulation period. One important aspect about parametric excitation is the pitch angle. The higher the excitation, the higher the pitch angle. Higher pitch angle may cause the heave mode to be coupled with the other two modes, since the heave motion is uncoupled only when the pitch angle is small. If the heave is coupled, then another dynamic model can be used. FIG. 23 shows the pitch angle in this case, which is below 30° most of the time and reaches 55° at peak points. It is assumed here that this pitch angle range is acceptable when using the dynamic model. For higher waves, when the parametric excitation effect is higher, the pitch angle will increase, the three modes will be coupled and nonlinear.

Figure 24:
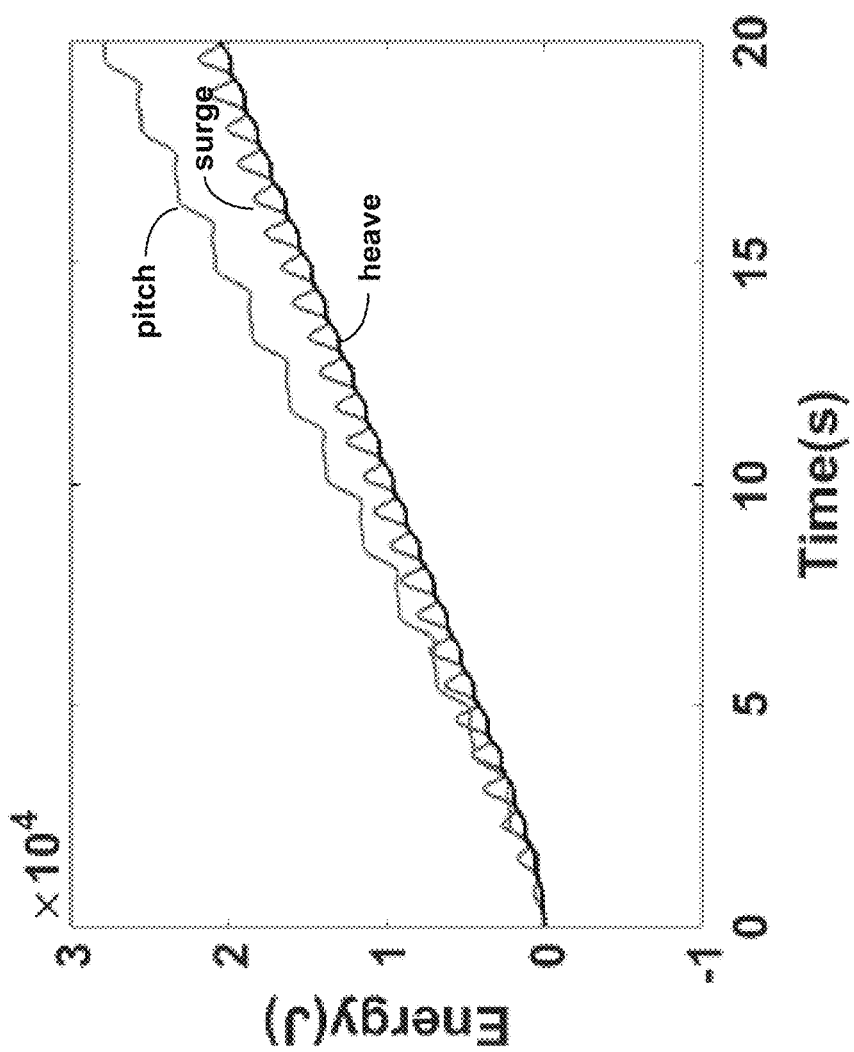
FIG. 24 is a graph showing the approximate energy extracted in pitch, surge, and heave modes in a regular wave.

Finally, when using the MPC for a parametric excited WEC device in a regular wave, it is possible to approximate the radiation forces on the device by a simple damping force with a constant damping matrix [C] instead of using a radiation state space model to compute the radiation forces. Usually the radiation force on a WEC in a regular wave, in the absence of parametric excitation, can be computed as a damping force with constant coefficient. However, the parametric excitation may cause the system to oscillate at multiple frequencies, hence a radiation state space model is needed for accurate calculation of the radiation forces. The simulation results, however, show that the error would be small if a constant-coefficient damping is used that is computed based on the regular wave frequency. Specifically, for the numerical test described above, the total harvested energy in the pitch-surge modes is $4.88 \times 10^4$ Joules when using a radiation state space model to compute the radiation force, while it is $4.86 \times 10^4$ Joules when using a constant coefficient radiation damping force. FIG. 24 shows the approximated harvested energy when using constant-coefficient radiation damping force. FIG. 10 shows the more accurate result when using the radiation state space model. The size of the radiation matrix $[A_r]$ used to generate this figure is 32×32.

The present invention has been described as model predictive control of parametric excited pitch-surge modes in wave energy converter. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A multi-resonant multiple degree-of-freedom wave energy converter, comprising:
    a buoy in a water environment having a wave motion, wherein the waves impacting the buoy exert an excitation force with a plurality of excitation frequencies that causes a buoy motion in heave, surge, and pitch directions relative to a reference,
    a power take-off that is configured to apply control forces in the heave, surge, and pitch directions to the buoy and harvest mechanical energy of the buoy motion,
    a predictor that is configured to predict the excitation force of the wave impacting the buoy in a future time horizon, and
    a controller that causes the power take-off to apply a force to the buoy to put the heave motion in resonance with the predicted wave excitation force in the heave direction and wherein the control forces in the surge and pitch directions are optimized using a model predictive control method to maximize parametric excitation of the surge-pitch motion by the heave motion.

2. The wave energy converter of claim 1, wherein a natural frequency of the pitch-surge motion of the wave enemy converter is tuned to be approximately half of the heave motion frequency.

3. The wave energy converter of claim 1, wherein the force in the heave direction is computed using a singular-arc control method.

* * * * *